United States Patent
Patel et al.

(10) Patent No.: US 11,700,633 B2
(45) Date of Patent: Jul. 11, 2023

(54) METHODS AND APPARATUS FOR SCHEDULING RESOURCES IN RADIO ACCESS NETWORKS

(71) Applicant: Telefonaktiebolaget LM Ericsson (publ), Stockholm (SE)

(72) Inventors: Dhruvin Patel, Aachen (DE); Hubertus Munz, Aachen (DE); Torsten Dudda, Wassenberg (DE); Alexandros Palaios, Moers (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/275,044

(22) PCT Filed: Dec. 18, 2018

(86) PCT No.: PCT/EP2018/085694
§ 371 (c)(1),
(2) Date: Mar. 10, 2021

(87) PCT Pub. No.: WO2020/057766
PCT Pub. Date: Mar. 26, 2020

(65) Prior Publication Data
US 2022/0061063 A1    Feb. 24, 2022

Related U.S. Application Data

(60) Provisional application No. 62/734,338, filed on Sep. 21, 2018.

(51) Int. Cl.
*H04W 72/04* (2023.01)
*H04W 72/543* (2023.01)
(Continued)

(52) U.S. Cl.
CPC ..... *H04W 72/543* (2023.01); *H04W 28/0268* (2013.01); *H04W 56/001* (2013.01); *H04W 72/1263* (2013.01)

(58) Field of Classification Search
None
See application file for complete search history.

(56) References Cited

U.S. PATENT DOCUMENTS

| 2007/0070902 A1 | 3/2007 | Elaoud et al. |
| 2018/0063020 A1 | 3/2018 | Bhagavatula et al. |

(Continued)

FOREIGN PATENT DOCUMENTS

| JP | 2014216873 A | 11/2014 |

OTHER PUBLICATIONS

"IEEE 802.1CA-D1.6", Draft Standard for Local and metropolitan area networks—Link-local Registration Protocol, Time-Sensitive Networking Task Group of IEEE 802.1 of the LAN MAN Standards Committee of the IEEE Computer Society, Aug. 2018, pp. 1-141.

(Continued)

*Primary Examiner* — Willie J Daniel, Jr.
(74) *Attorney, Agent, or Firm* — Murphy, Bilak & Homiller, PLLC

(57) ABSTRACT

The disclosure provides various methods for time-aware scheduling of time-sensitive network (TSN) streams in 5G networks. One method, performed in a core network associated with a radio access network (RAN), is for scheduling resources in the RAN according to a transmission schedule associated with an external network. The method comprises receiving (1210), from the external network, a transmission schedule associated with a time-sensitive data stream and sending (1220), to the RAN, a request to allocate radio resources for communication of the data stream between the RAN and a user equipment (UE). The request further comprises information related to the transmission schedule.

(Continued)

The method also comprises receiving (1230), from the RAN, a response indicating whether radio resources can be allocated to meet the transmission schedule associated with the data stream.

22 Claims, 20 Drawing Sheets

(51) Int. Cl.
    *H04W 28/02*     (2009.01)
    *H04W 56/00*     (2009.01)
    *H04W 72/1263*     (2023.01)

(56) References Cited

U.S. PATENT DOCUMENTS

2018/0160424 A1   6/2018   Cavalcanti et al.
2018/0183708 A1   6/2018   Farkas et al.

OTHER PUBLICATIONS

"IEEE Std 802.1Qci™-2017", Bridges and Bridged Networks—Amendment 28: Per-Stream Filtering and Policing, IEEE Standard for Local and metropolitan area networks; IEEE Computer Society; Feb. 14, 2017, pp. 1-65.
"IEEE Std 802.1CB™-2017", Frame Replicaton and Elimination for Reliability, IEEE Standard for Local and metropolitan area networks; IEEE Computer Society; Sep. 28, 2017, pp. 1-102.
"IEEE P802.1CBcv/D1.1", Frer Yang Data Model and Management Information Base Module; Draft Standard for Local and metropolitan area networks—Frame Replication and Elimination for Reliability—Amendment, Feb. 12, 2021, pp. 1-185.
"IEEE Std 802.1Qbv™-2015", IEEE Standard for Local and metropolitan area networks—Bridges and Bridged Networks, Amendment 25: Enhancements for Scheduled Traffic, Dec. 2015, pp. 1-57.
"IEEE Std. 802.1Qat-2010", Virtual Bridged Local Area Networks; Amendment 14: Stream Reservation Protocol (SRP), IEEE Standard for Local and metropolitan area networks; IEEE Computer Society, Sep. 20, 2010, pp. 1-119.
"IEEE Std 802.1Q (2005)", IEEE Standard for Local and metropolitan area networks, Virtual Bridged Local Area Networks, May 19, 2006, pp. 1-303.
"IEEE Std 802.1Qca™-2015", Bridges and Bridged Networks—Amendment 24: Path Control and Reservation, IEEE Standard for Local and metropolitan area networks; Mar. 11, 2016, pp. 1-120.
"IEEE Std 802.1Qch™-2017", Bridges and Bridged Networks—Amendment 29: Cyclic Queuing and Forwarding, IEEE Standard for Local and metropolitan area networks; May 18, 2017, pp. 1-30.
"IEEE Std 802.1Qcp-2018", Bridges and Bridged Networks—Amendment 30: Yang Data Model, IEEE Standard for Local and metropolitan area networks; Jun. 14, 2018, pp. 1-93.
"IEEE Std 802.1Qcc™-2018", Bridges and Bridged Networks—Amendment 31: Stream Reservation Protocol (SRP) Enhancements and Performance Improvements, IEEE Standard for Local and Metropolitan Area Networks; Oct. 31, 2018, pp. 1-208.
"IEEE P802.1 Qbu/D3.0", Bridges and Bridged Networks—Amendment: Frame Preemption, Draft Standard for Local and Metropolitan Area Networks, Jul. 29, 2015, pp. 1-35.
"IEEE P802.1Qcr/D0.5", Draft Standard for Local and Metropolitan Area Networks—Bridges and Bridged Networks—Amendment: Asynchronous Traffic Shaping, Jun. 12, 2018, pp. 1-112.
"IEEE P802.1CS/D1.6", Link-local Registration Protocol; Draft Standard for Local and metropolitan area networks; 2018, pp. 1-141.
"IEEE Std 802.1AS™-2011", Timing and Synchronization for Time-Sensitive Applications in Bridged Local Area Networks, IEEE Standard for Local and metropolitan area networks; Feb. 10, 2011, pp. 1-292.
"IEEE Std 802.1Qav™-2009", Virtual Bridged Local Area Networks—Amendment 12: Forwarding and Queuing Enhancements for Time-Sensitive Streams, IEEE Standard for Local and metropolitan area networks; Jan. 5, 2010, pp. 1-87.
"Integration of the 5G System In a TSN network", SA WG2 Meeting #128-Bis, S2-18xxxx, Sophia Antipolis, Aug. 20-24, 2018, pp. 1-8.
"Mobility for vertical LAN (deterministic) services (e.g. TSN)", SA WG2 Meeting #128-Bis, S2-18xxxx, Sophia Antipolis, Aug. 20-24, 2018, pp. 1-11.
"QoS Negotiation between JGPP and TSN networks KI#3.1", SA WG2 Meeting #128Bis, S2-188233, Sophia Antipolis, France (revision of S2-1Bxxxx), Aug. 20-24, 2018, pp. 1-9.
"Solution for system enhancement to support TSN", SA WG2 Meeting #128-Bis, S2-188299, Sophia Antipolis, France, (revision of S2-18xxxx), Aug. 20-24, 2018, pp. 1-4.
"TSN—QoS Framework", SA WG2 Meeting #128-Bis, S2-188101, Sophia Antipolis, Aug. 20-24, 2018, pp. 1-7.

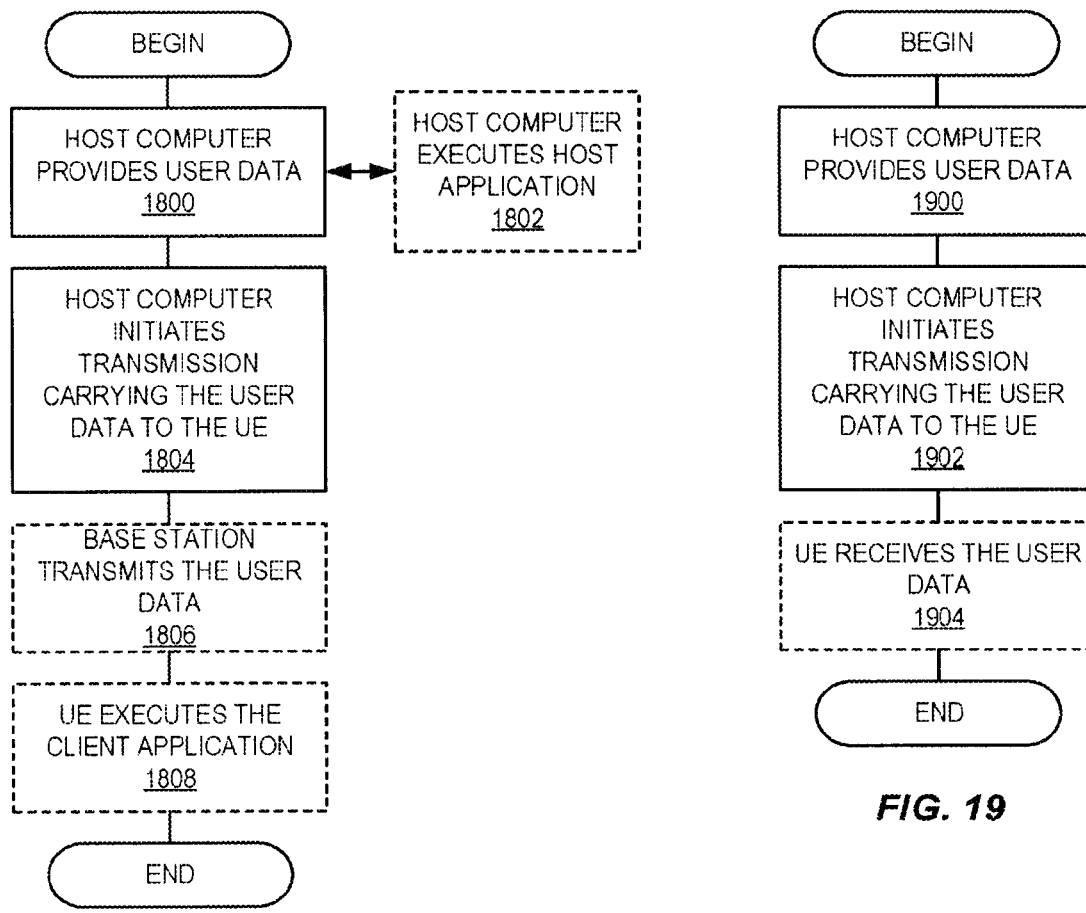

METHODS AND APPARATUS FOR SCHEDULING RESOURCES IN RADIO ACCESS NETWORKS

TECHNICAL FIELD

Embodiments of the disclosure relate to methods and apparatus for scheduling resources in a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Industry 4.0 is a term often used to refer to a current trend of automation and data exchange in manufacturing. It can include concepts and/or technologies such as cyber-physical systems, the Internet of things (IoT), cloud computing, and cognitive computing. Industry 4.0 is also referred to as the fourth industrial revolution or "I4.0" for short.

One scenario or use case for Industry 4.0 is the so-called "smart factory". Within modular structured smart factories, cyber-physical systems monitor physical processes, create a virtual copy of the physical world, and make decentralized decisions. Over the Internet of Things, cyber-physical systems communicate and cooperate with each other, and with humans, in real-time both internally and across organizational services offered and used by participants of a value chain of which the smart factory is a part.

There are four common principles associated with Industry 4.0. First, "interoperability" requires the ability to connect machines, devices, sensors, and people to communicate with each other via the IoT or, alternatively, the "Internet of People" (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These principles associated with Industry 4.0 support various use cases that place many requirements on a network infrastructure. Use cases include simpler ones such as plant measurement to more difficult ones (e.g. in terms of communication requirements) such as precise motion control in a robotized factory cell. To address these requirements, the IEEE 802.1 working group (particularly, task group TSN) has developed a Time Sensitive Networking (TSN) standard. In addition, fifth-generation (5G) mobile communication technology is being standardized by the Third Generation Partnership Project (3GPP) with one of the goals being to support such Industry 4.0 requirements.

While 5G is based on wireless communications using Long-Term Evolution (LTE) and/or New Radio (NR) technologies, TSN is based on the IEEE 802.3 Ethernet standard, a wired communication standard that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);
Bounded Low Latency (e.g., IEEE 802.1Qav, IEEE 802.1Qbu, IEEE 802.1Qbv, IEEE 802.1Qch, IEEE 802.1Qcr);
Ultra-Reliability (e.g., IEEE 802.1CB, IEEE 802.1Qca, IEEE 802.1Qci);
Network Configuration and Management (e.g., IEEE 802.1Qat, IEEE 802.1Qcc, IEEE 802.1Qcp, IEEE 802.1CS).

The configuration and management of a TSN network can be implemented in different ways, as illustrated in FIGS. 1-3. More specifically, FIGS. 1-3 are block diagrams that respectively illustrate Distributed, Centralized, and Fully Centralized Time-Sensitive Networking (TSN) configuration models, as specified in IEEE Std. 802.1Qbv-2015. Within a TSN network, the communication endpoints are called "Talker" and "Listener." All the switches and/or bridges between a Talker and a Listener can support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. The TSN configuration and management features are used to set up the stream and to guarantee the stream's requirements across the network. In the distributed model from FIG. 1, the Talker and Listener can, for example, use the Stream Reservation Protocol (SRP) to setup and configure a TSN stream in every switch along the path from Talker to Listener in the TSN network.

Nevertheless, some TSN features may require a central management entity called Centralized Network Configuration (CNC), as shown in FIG. 2. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets may arrive at a switch ingress port before the gate is scheduled to be open. The fully centralized model shown in FIG. 3 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

FIG. 4 shows a sequence diagram of an exemplary TSN stream configuration procedure based on the fully centralized configuration model shown in FIG. 3. The numbered operations shown in FIG. 4 correspond to the description below. Even so, the numerical labels are used for illustration rather than to specify an order for the operations. In other words, the operations shown in FIG. 4 can be performed in different orders and can be combined and/or divided into other operations than shown in the figure.

1 CUC can receive input from, e.g., an industrial application and/or engineering tool (e.g., a programmable logic control, PLC) that specifies devices and/or end stations to exchange time-sensitive streams.
2 CUC reads the capabilities of end stations and applications in the TSN network, including a period/interval of user traffic and payload sizes.
3 Based on this above information CUC creates StreamID as an identifier for each TSN stream, a StreamRank, and UsertoNetwork Requirements. In the TSN network, the streamID is used to uniquely identify stream configurations and to assign TSN resources to a user's stream. The streamID consists of the two tuples: 1) MacAddress associated with the TSN Talker; and 2) UniqueID to distinguish between multiple streams within end stations identified by MacAddress.
4 CNC discovers the physical network topology using for example Link Layer Discovery Protocol (LLDP) and any network management protocol.
5 CNC uses a network management protocol to read TSN capabilities of bridges (e.g., IEEE 802.1Q, 802.1AS, 802.1CB) in the TSN network.
6 CUC initiates join requests to configure network resources at the bridges for a TSN stream from one Talker to one Listener.
7 Talker and Listener groups (group of elements specifying a TSN stream) are created by CUC, as specified in IEEE 802.1Qcc, 46.2.2). CNC configures the TSN domain, and checks physical topology and if the time sensitive streams are supported by bridges in the network. CNC also performs path and schedule computation of streams.
8 CNC configures TSN features in bridges along the computed path in the (e.g., configuration of the transmission schedule, as explained further below).
9 CNC returns status (success or failure) for resulting resource assignment for streams to CUC.
10 CUC further configures end stations to start the user plane (UP) traffic exchange as defined initially between Listener and Talker.

In the distributed configuration model as illustrated in FIG. 1, there is no CUC and no CNC. The Talker is therefore responsible for initiation of a TSN stream. Since no CNC is present, the bridges configure themselves, which does not allow use of time-gated queuing mentioned above. In contrast, in the centralized model shown in FIG. 2 the Talker is responsible for stream initialization but the bridges are configured by CNC.

3GPP-standardized 5G networks are one solution for connecting wireless devices and/or end stations to an 802.1 TSN network. In general, the 5G network architecture consists of a Next Generation radio access network (NG-RAN) and a 5G core network (5GC). The NG-RAN can comprise a set of gNodeB's (gNBs, also referred to as base stations) connected to the 5GC via one or more NG interfaces, whereas the gNBs can be connected to each other via one or more Xn interfaces. Each of the gNBs can support frequency division duplexing (FDD), time division duplexing (TDD), or a combination thereof. Devices—also referred to as user equipment (UE)—communicate wirelessly with the 5G network via the gNBs.

FIG. 5 is a block diagram illustrating an exemplary division of the 5G network architecture into control plane (CP) and data or user plane (UP) functionality. For example, a UE can communicate data packets to a device and/or application on an external network (e.g., the Internet) by sending them via a serving gNB to a user plane function (UPF), which provides an interface from the 5G network to other external networks. CP functionality can operate cooperatively with the UP functionality and can include various functions shown in FIG. 5, including an access management function (AMF) and a session management function (SMF).

Even so, there are several challenges and/or issues needing to be solved for the proper interworking of 5G and TSN networks. In particular, there are several challenges related to configuring a 5G network to handle data communications to/from an external network (e.g., a TSN network) that are subject to a time-critical schedule determined by the external network rather than the 5G network.

SUMMARY

Exemplary embodiments disclosed herein address these and other problems, issues, and/or drawbacks of existing solutions.

Exemplary embodiments include various methods and/or procedures for scheduling resources in a radio access network (RAN) according to a transmission schedule associated with an external network. Such exemplary methods and/or procedures can be implemented in a core network (e.g., 5GC) associated with the RAN (e.g., NG-RAN).

The exemplary methods and/or procedures can include receiving, from the external network, a transmission schedule associated with a time-sensitive data stream. In some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary methods and/or procedures can also include sending, to the RAN, a request to allocate radio resources for communication of the data stream between the RAN and a user equipment (UE), wherein the request further comprises information related to the transmission schedule. In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary methods and/or procedures can also include receiving, from the RAN, a response indicating whether radio resources can be allocated to meet the transmission schedule associated with the data stream. In some embodiments, if the response indicates that radio resources cannot be allocated to meet the transmission schedule of the data stream, the response further comprises an indication of one or more further time windows during which radio resources can be allocated.

In some embodiments, the response can indicate whether the QoS requirement associated with each of the QoS flows can be met. In such embodiments, the exemplary methods and/or procedures can also include determining whether the transmission schedule can be met based on the indication of whether the QoS requirement associated with each of the QoS flows can be met. In some embodiments, the exemplary methods and/or procedures can also include sending, to the external network, an indication of whether the transmission schedule can be met.

In some embodiments, the method can be performed by an access management function (AMF) in a 5GC. In some embodiments, the transmission schedule can be received from the external network; and the radio resources are for downlink communication from the RAN to the UE. In some embodiments, the transmission schedule is received from the UE; and the radio resources are for uplink communication from the UE to the RAN.

Other exemplary embodiments include various other methods and/or procedures for scheduling resources in a radio access network (RAN) according to a transmission schedule associated with an external network. These exemplary methods and/or procedures can be implemented in a RAN (e.g., NG-RAN) associated with a core network (e.g., 5GC).

These exemplary methods and/or procedures can include receiving, from the core network, a request to allocate radio resources between the RAN and a user equipment (UE) for communication of a time-sensitive data stream, wherein the request further comprises information related to a transmission schedule associated with the data stream. In some embodiments, the external network comprises a Time-Sensitive Network (TSN); and the data stream comprises a TSN stream.

In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary methods and/or procedures can also include, based on the information related to the transmission schedule, determining whether radio resources can be allocated to meet the transmission schedule. In some embodiments, determining whether radio resources can be allocated to meet the transmission schedule can be further based on one or more of the following: resources needed for current or estimated traffic load, capabilities of the UE, channel quality between the RAN and the UE, and need for additional guaranteed resources to be allocated for the UE.

In some embodiments, if it is determined that radio resources cannot be allocated to meet the transmission schedule associated with the data stream, the exemplary methods and/or procedures can also include determining one or more further time windows during which radio resources can be allocated. In some embodiments, if it is determined that radio resources can be allocated to meet the transmission schedule associated with the data stream, the exemplary methods and/or procedures can also include mapping the one or more QoS flows to at least one radio bearer between the RAN and the UE, and reserving transmission resources for the at least one radio bearer.

The exemplary methods and/or procedures also include sending, to the core network, a response indicating whether the radio resources can be allocated to meet the transmission schedule. In some embodiments, if it is determined that radio resources cannot be allocated to meet the transmission schedule, the response can also include an indication of the one or more further time windows.

Other exemplary embodiments include various other methods and/or procedures for scheduling resources in a radio access network (RAN) according to a transmission schedule associated with an external network. These exemplary methods and/or procedures can be implemented in a user equipment (UE, e.g., wireless device, IoT device, machine to machine (M2M) device, etc.) in communication with a RAN (e.g., NG-RAN) that is associated with a core network (e.g., 5GC).

The exemplary methods and/or procedures can include receiving, from the external network, a transmission schedule associated with a time-sensitive data stream. In some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary methods and/or procedures can also include sending, to a core network associated with the RAN, a request to allocate radio resources for communication of the data stream between the UE and the RAN, wherein the request further comprises information related to the transmission schedule. In some embodiments, the information related to the transmission schedule comprises the transmission schedule.

The exemplary methods and/or procedures can also include receiving, from the core network, a response indicating whether radio resources can be allocated to meet the transmission schedule associated with the data stream. In some embodiments, if the response from the core network indicates that radio resources cannot be allocated to meet the transmission schedule of the data stream, the response further comprises an indication of one or more further time windows during which radio resources can be allocated. In some embodiments, the request can be sent to, and the response can be received from, an access management function (AMF) in a 5GC.

In some embodiments, the exemplary methods and/or procedures can also include sending, to the external network, an indication of whether the transmission schedule can be met. In some embodiments, if the response comprises an indication of one or more further time windows during which radio resources can be allocated, the indication sent to the external network further includes information related to the one or more further time windows.

Other exemplary embodiments include core network nodes, RAN nodes, and UEs configured to perform operations corresponding to the exemplary methods and/or procedures described above. Other exemplary embodiments include non-transitory, computer-readable media storing program instructions that, when executed by at least one processor, configure such core network nodes, RAN nodes, and UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

BRIEF DESCRIPTION OF THE DRAWINGS

For a better understanding of examples of the present disclosure, and to show more clearly how the examples may be carried into effect, reference will now be made, by way of example only, to the following drawings in which:

FIGS. 18-21 are flow diagrams illustrating various exemplary methods and/or procedures implemented in a communication system, according to various exemplary embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 5:
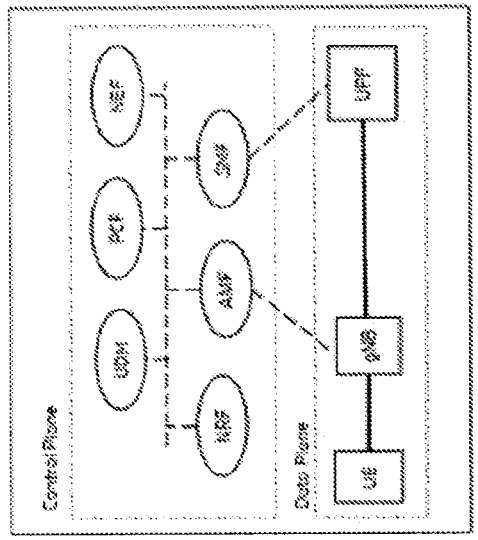
FIG. 5 is a block diagram illustrating a control plane (CP) and a data or user plane (UP) architecture of an exemplary 5G wireless network.
Figure 6:
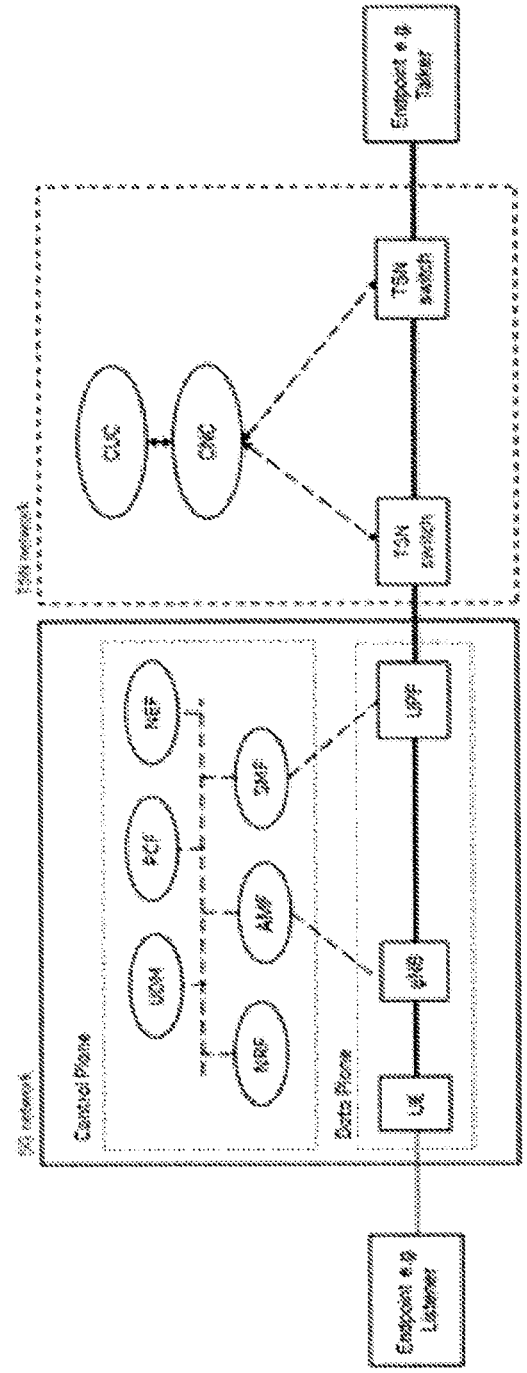
FIG. 6 is a block diagram illustrating an exemplary arrangement for interworking between the 5G network architecture shown in FIG. 5 and an exemplary fully centralized TSN network architecture.

FIG. 6 is a block diagram illustrating an exemplary arrangement for interworking between the 5G network architecture shown in FIG. 5 and an exemplary fully centralized TSN network architecture. In the following discussion, a device connected to the 5G network is referred to as 5G endpoint, and a device connected to the TSN domain is referred to as TSN endpoint. The arrangement shown in FIG. 6 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

Both 5G and TSN networks utilize specific procedures for network management and configuration, and specific mechanisms to achieve deterministic performance. To facilitate end-to-end deterministic networking for industrial networks, these different procedures and mechanisms must work together cooperatively.

Figure 7:
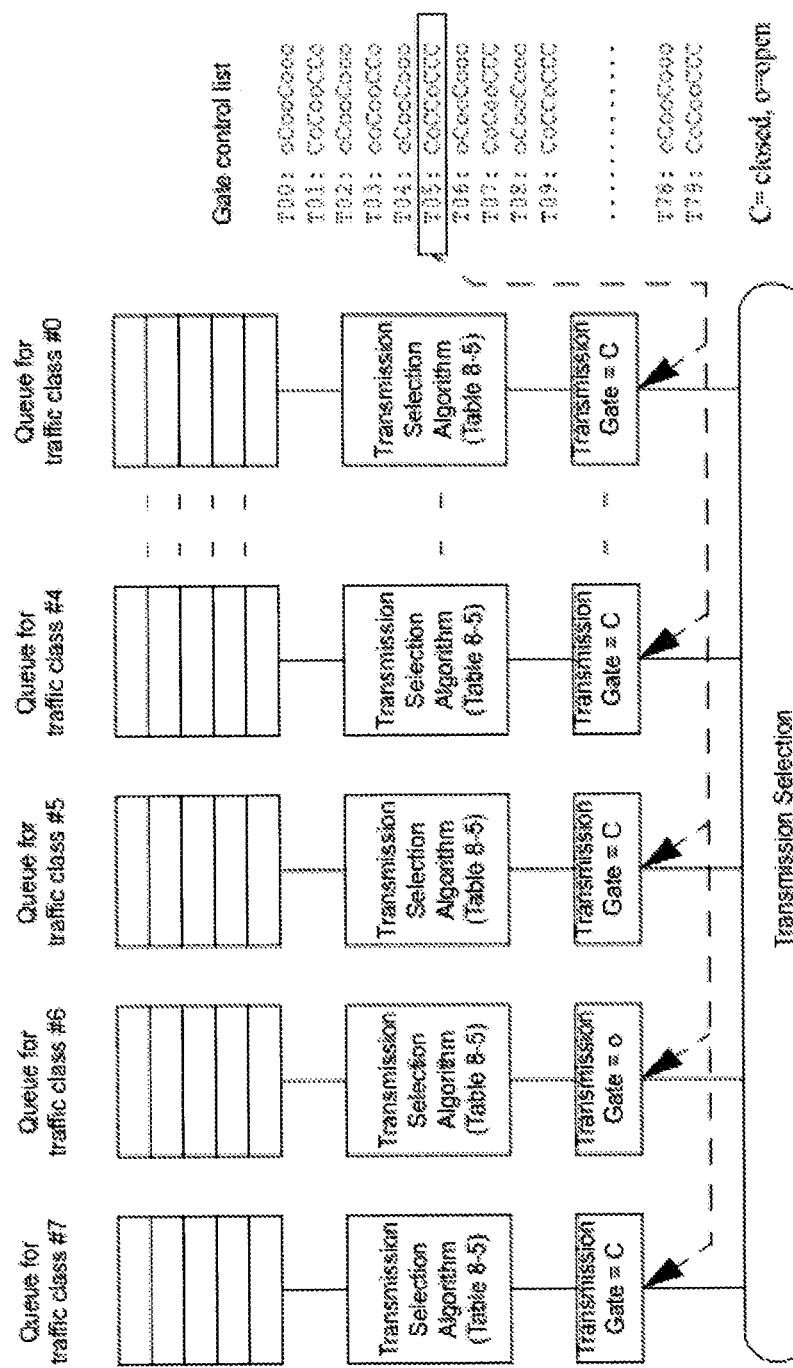
FIG. 7 is a block diagram illustrating transmission selection among traffic queues based on gates, as specified in IEEE Std. 802.1Qbv-2015.

As described in IEEE 802.1Qbv-2015, TSN provides specific time-aware traffic scheduling to facilitate deterministic low latency for industrial application, where cycle time is known in advance. This traffic scheduling is based on time-aware gates that enable transmissions from each queue according to a predefined time scale. FIG. 7 is a block diagram illustrating gate-based transmission selection among traffic queues based on gates, as specified in IEEE Std. 802.1Qbv-2015. For a given queue, the transmission gates can be in two states: open or closed.

Furthermore, each transmission gate relates to a traffic class associated with a specific queue, with potentially multiple queues associated with a given port. At any instance of time, a gate can be either turned on or off. This mechanism is time-aware and can be based on, e.g., a PTP application within a TSN bridge or a TSN end station. This mechanism allows execution of a gate control list to be precisely coordinated across the network, facilitating tightly-scheduled transmissions for a given class of traffic. Herein, a transmission schedule can be defined as a schedule that indicates when transmissions are to occur in time. Also, a time-critical transmission schedule can be defined as a schedule that indicates when transmissions of a Time-Sensitive Network (TSN) are to occur in time.

Figure 1:
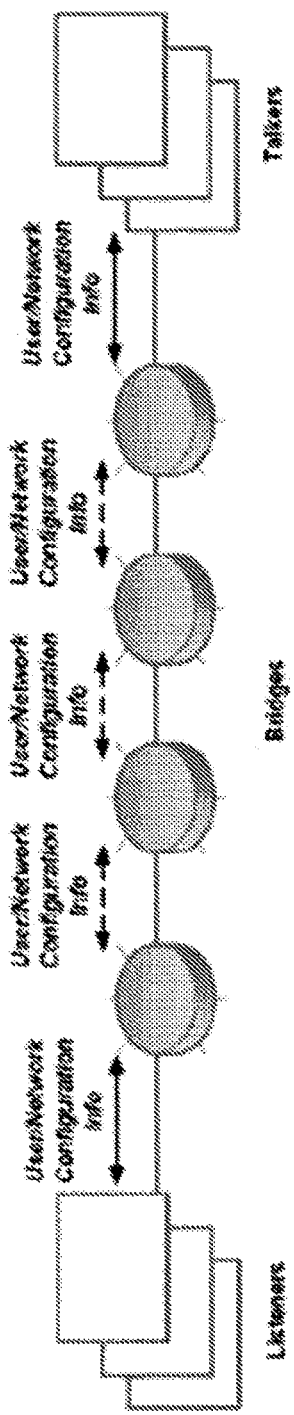
FIG. 1 is a block diagram illustrating a Distributed Time-Sensitive Networking (TSN) configuration model, as specified in IEEE Std. 802.1Qbv-2015.
Figure 2:
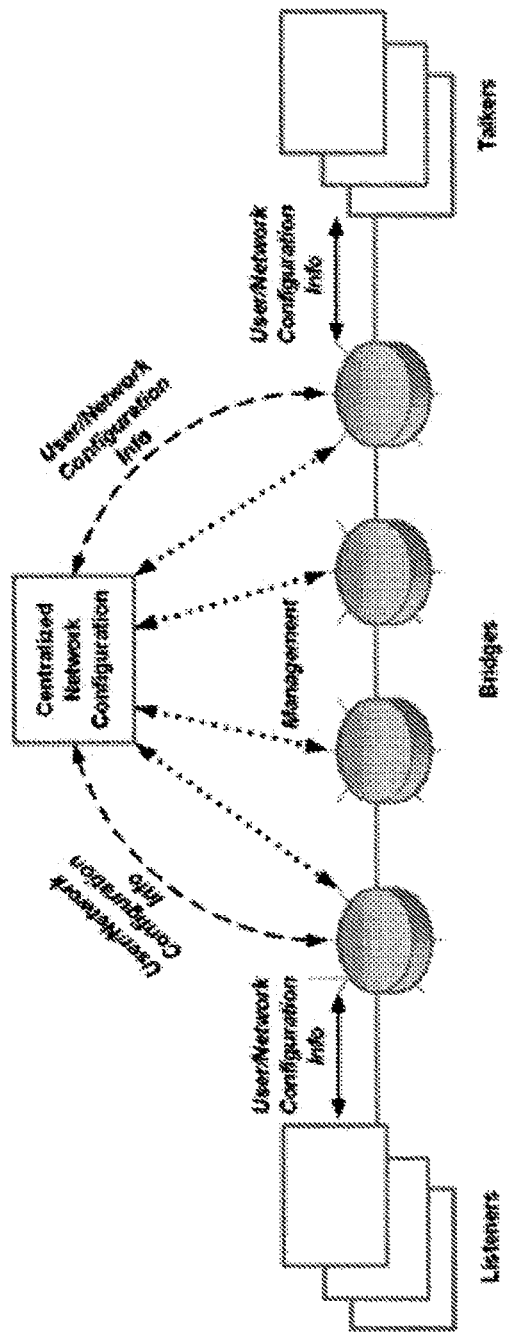
FIG. 2 is a block diagram illustrating a Centralized TSN configuration model, as specified in IEEE Std. 802.1Qbv-2015.
Figure 3:
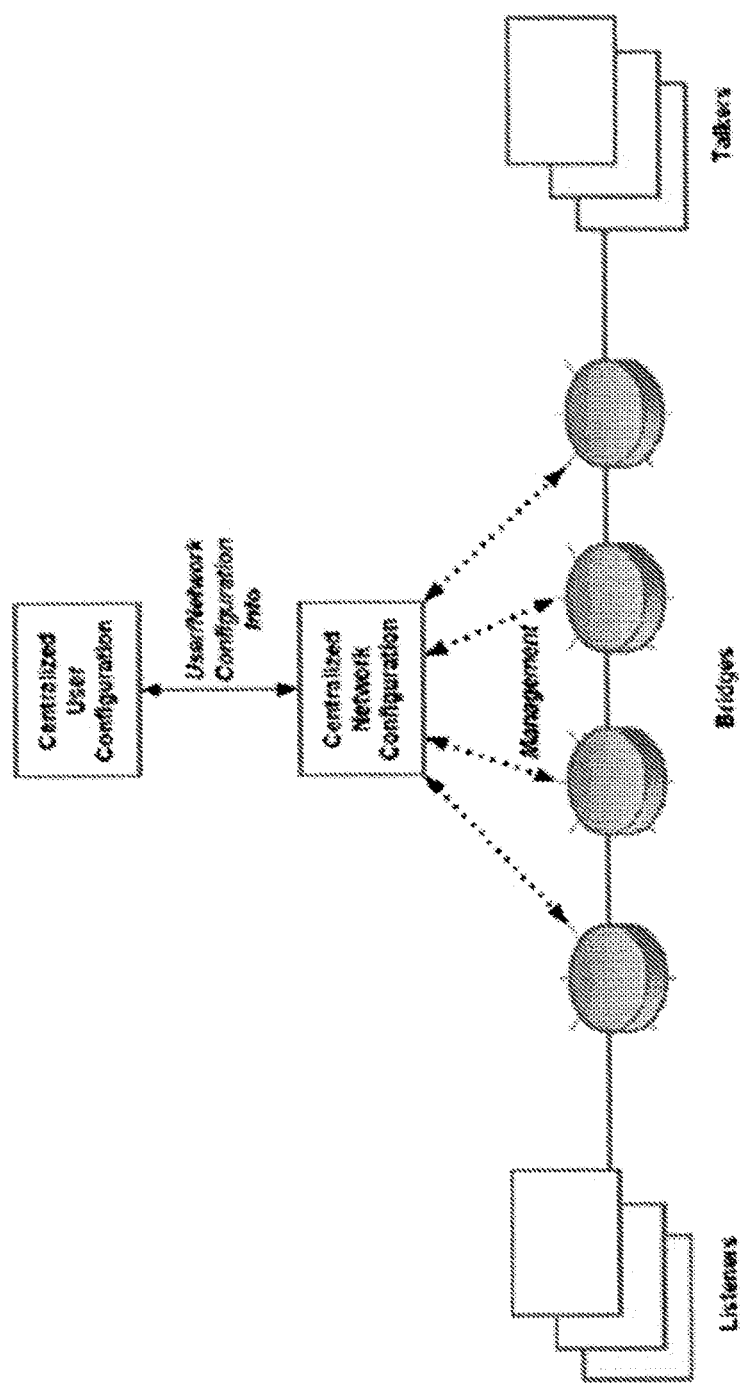
FIG. 3 is a block diagram illustrating a Fully Centralized TSN configuration model, as specified in IEEE Std. 802.1Qbv-2015.
Figure 4:
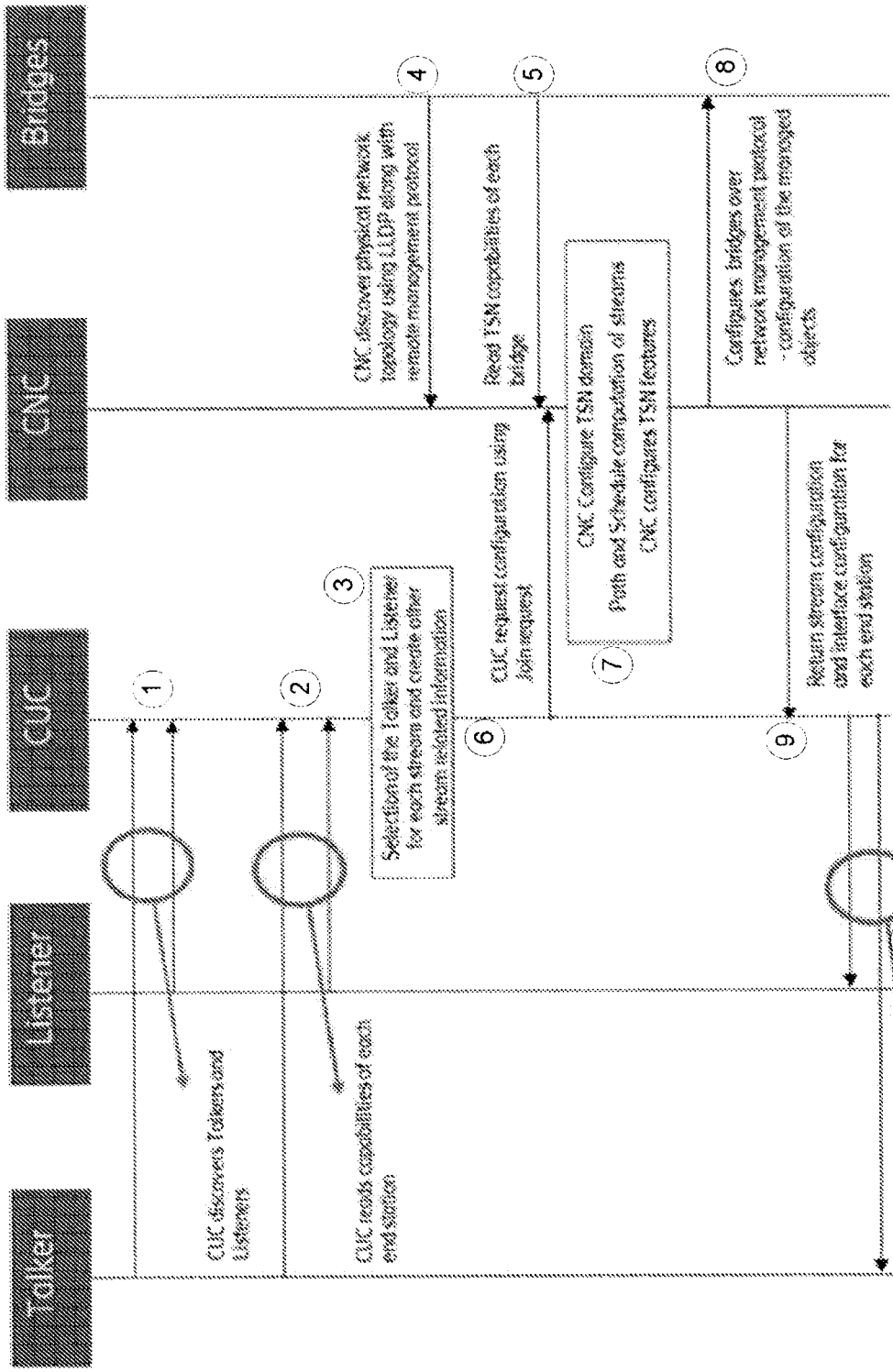
FIG. 4 shows a sequence diagram of an exemplary TSN stream configuration procedure using the fully centralized configuration model shown in FIG. 3.

As described above in relation to FIG. 4, the information about TSN stream schedules are is calculated by a CNC entity in the fully-centralized TSN model, based on the user to network requirements (e.g., IEEE 802.1Qcc § 46.2.3.6 of) provided by Talker and/or Listener (and/or via the CUC entity). In addition, standard management objects (e.g., defined in IEEE 802.1Qvc) and a remote network management protocol are used by the CNC to configure transmission schedules on TSN bridges (operation 8 in FIG. 4).

Nevertheless, these features are specific to TSN networks and do not take into account interworking 5G network architecture, such as illustrated in FIG. 6. For example, 5G networks do not provide any mechanism for elements (e.g., UEs, gNBs, etc.) to take into account time-critical transmission schedules established by external networks (e.g., TSN networks) when scheduling transmissions over the wireless interface between UE and gNB. For example, even if such a time-critical transmission schedule is known to a UE (e.g., connected to a TSN endpoint), there is no mechanism for the UE to inform the gNB of such a schedule. Furthermore, there is no mechanism that enables the gNB or UE to understand and process scheduling requests, coming from the 5G network.

Exemplary embodiments of the present disclosure address these and other problems and/or shortcomings of prior solutions by providing novel techniques for predefined time scheduling for specific users and/or QoS flows based on time-aware transmission schedules (e.g., from external networks) to meet specific bounded latency requirements. For example, these techniques can provide mechanisms for a UE (or network node, e.g., gNB) to be informed of such a transmission time schedule and to inform the network node (or UE) of the schedule. In this manner, such novel techniques can provide various benefits including cooperative interworking between cellular (e.g., 5G) and TSN networks that utilize different schedulers and/or scheduling mechanisms, thereby facilitating bounded latency of time-critical transmissions between Talker/Listener endpoints via 5G networks.

Figure 8:
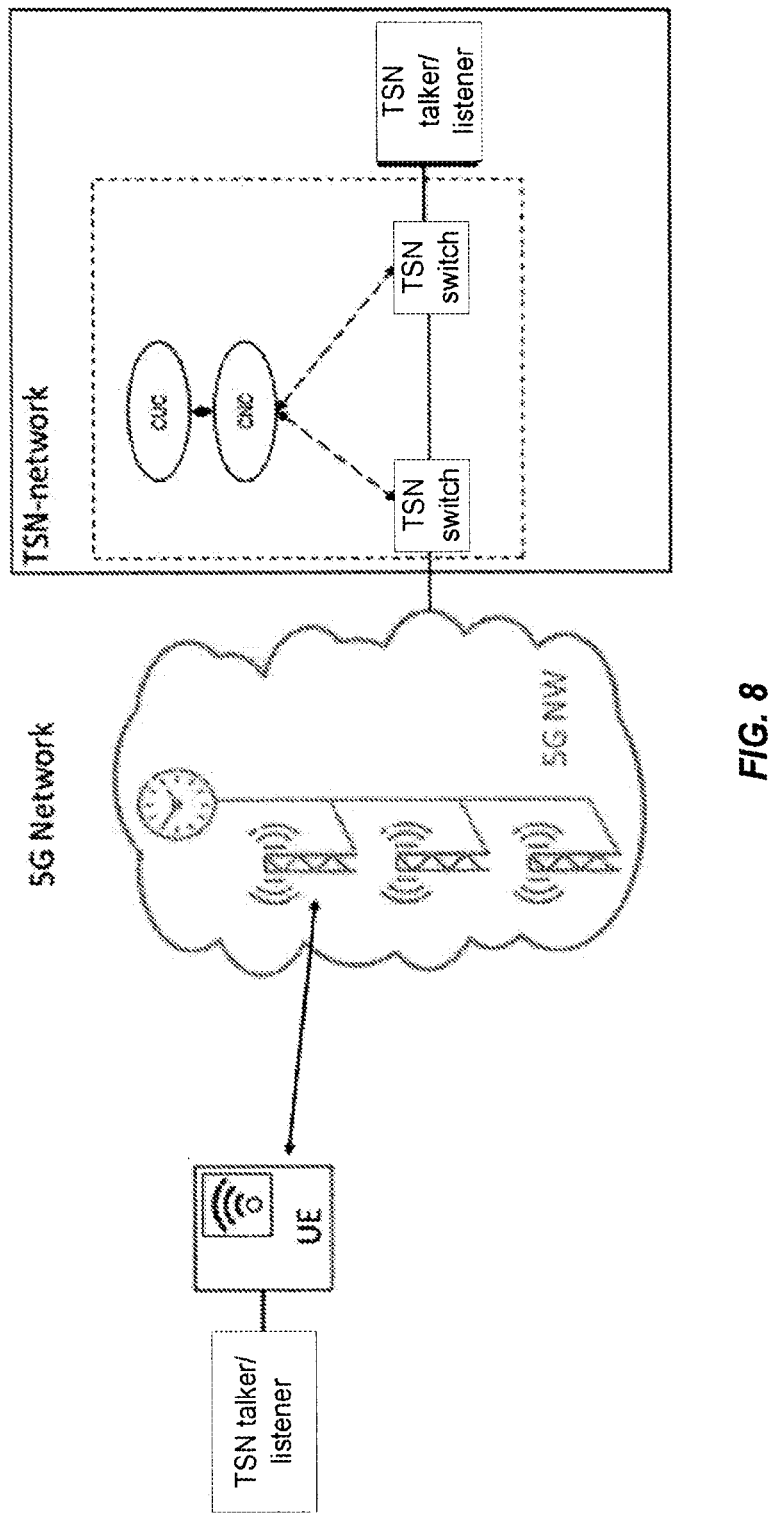
FIG. 8 is a block diagram illustrating an exemplary communication scenario between two TSN talker/listener units via 5G and TSN networks, according to various exemplary embodiments of the present disclosure.

FIG. 8 is a block diagram illustrating an exemplary communication scenario between two TSN talker/listener units via 5G and TSN networks, according to some exemplary embodiments of the present disclosure. In this scenario, a UE is connected to a TSN talker/listener, which in turn can be connected to plant equipment (e.g., a robot control) that is required to run an application according to a predefined cycle time. One challenge in this scenario is to facilitate timely transmission of the TSN stream packets from the gNB to the UE, according to the bounded latencies required by the equipment and/or application.

Figure 9:
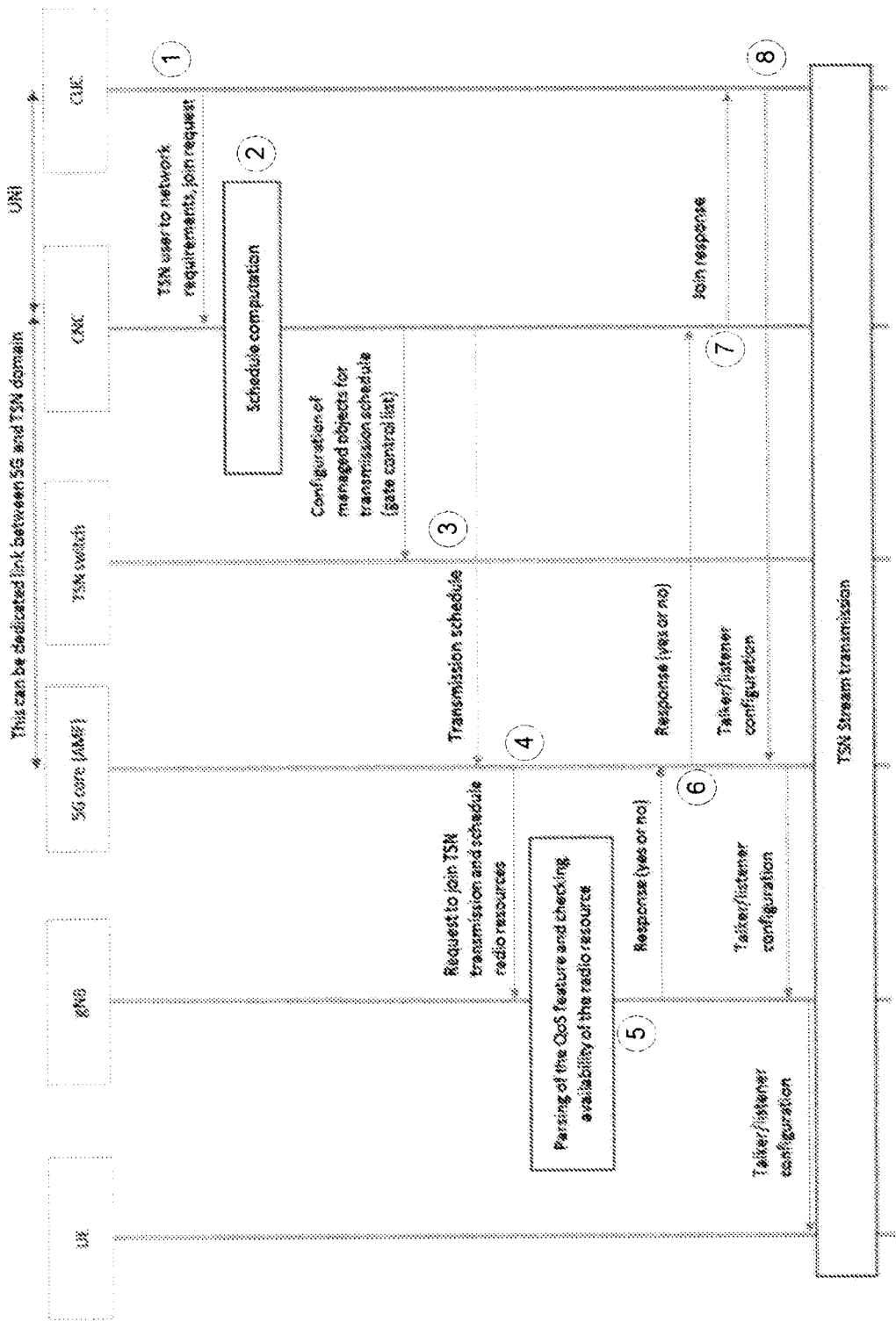
FIG. 9 shows a sequence diagram of an exemplary method and/or procedure for configuring timely delivery of TSN stream packets via the network configuration shown in FIG. 8, according to various exemplary embodiments of the present disclosure.

FIG. 9 shows a sequence diagram of an exemplary method and/or procedure for configuring timely transmission of TSN stream packets via the network configuration shown in FIG. 8, according to these exemplary embodiments. The numbered operations shown in FIG. 9 correspond to the description below. Even so, the numerical labels are used for illustration rather than to specify an order for the operations. In other words, the operations shown in FIG. 9 can be performed in different orders and can be combined and/or divided into other operations than shown in the figure.

In operation 11, the CUC sends to the CNC a join request for a user to join the TSN network. For example, this request can be based on and/or in response to a programmable logic control (PLC) application requesting to schedule a TSN stream between a sensor (Talker) and a PLC controller (Listener). In operation 12, the CNC computes a transmission schedule based on the specific requirements of the TSN stream identified in operation 11.

In operation 13, the CNC configures managed objects of TSN switches that are in the path between the sensor and PLC controller. Exemplary managed object to be configured for enhanced time-aware scheduling are described in IEEE 802.1Qbv-2015 § 12. In exemplary embodiments, the CNC treats the 5G network as a TSN switch in the path, and therefore requests the 5G core network (5GC) to configure resources for this TSN stream. For example, this can be done by the CNC sending to an access management function (AMF, see FIGS. 5-6) the cycle times and gate control lists for traffic classes within the TSN stream.

In operation 14, the receiving entity (e.g., AMF) in the 5GC can translate the requested TSN stream requirements (e.g., cycle time, gate control list, etc.) to QoS requirements for the UE that is connected to the TSN Talker/Listener (e.g., sensor). In addition, the AMF can translate the requested TSN stream requirements into a time window and periodicity for the gNB(s) to which the UE will transmit and/or receive this TSN stream.

In some embodiments, operation 14 can involve various sub-operations. For example, the UE and a PDU session corresponding to the TSN stream can be identified, and a mapping between traffic classes within this TSN stream and QoS flows of the UE can be identified. For each QoS flow (which can correspond to one or multiple traffic classes), a certain QoS requirement can be indicated to the gNB. In some embodiments, this indication to the gNB can include an indicator of a time-window during which a packet of the QoS flow should be guaranteed to be transmitted. This time window can be indicated, e.g., by providing an absolute time reference for the time window start together with a length of the window (e.g., as a latency bound). For example, the absolute time reference can be indicated as an offset to a certain absolute reference time such gNB subframe (SFN) timing or a universal time coordinate (UTC), such as provided by a global navigation satellite system (GNSS, e.g., GPS). In some embodiments, the indication to the gNB can also include a periodicity (or period) of the time window. This can be included, e.g., if the TSN stream comprises multiple transmission events that occur according to a periodic schedule.

By indicating this time-window information per QoS flow of the UE, multiple traffic classes of a TSN stream or multiple TSN streams can be independently served. In other words, this information facilitates the affected gNB(s) to reserve radio resources for each of the QoS flows during the respective time windows associated with those QoS flows. For example, this can facilitate the gNB(s) to map the various QoS flows to different radio bearers and to apply the resource allocation/reservation per radio bearer. Herein, a radio bearer takes the usual definition from the $3^{rd}$ Generation Partnership Project (3GPP).

In operation 14, after determining the information as discussed above, the AMF sends an indication and/or request the gNB(s) to confirm that the QoS, time window, and/or periodicity requirements can be met. In operation 15, after receiving the request/indication sent in operation 14, the gNB (or gNBs, as the case may be) determines whether it can serve this additional QoS flow with the indicated time-window requirement. For example, in making this determination, the gNB can consider resources used for current and estimated traffic load, capabilities of the UE (e.g., spectral efficiency, supported transmission/reception modes, etc.), channel quality between the RAN and the UE, and whether (and/or how many) additional guaranteed resources need to be allocated for the UE. After making this determination, the gNB responds to the 5GC function (e.g., AMF) by accepting the request ("yes") or declining the request ("no"). In some embodiments, when declining the request, the gNB can indicate an alternative time window (e.g., by an offset to the requested time window) during which the gNB could accept a corresponding request. In situations where the gNB accepts the request, the gNB can also reserve any additional resources identified as required to meet the requested transmission schedule.

In operation 16, after receiving the response from the gNB(s), the 5GC function may then translate this response—which is based on per QoS flow mapping—to a traffic flow/TSN stream level of granularity, and provides a response to the TSN CNC. The response may be in a format that can be decoded by the TSN CNC. In operation 17, after receiving this response, the CNC provides to the CUC a corresponding response to the join request received in operation 11. In operation 18, after receiving the join response from the CNC, the CUC further configures all Talker and Listener end station associated with the original request. In some embodiments, the CUC can also request the 5GC to initiate a connection to the UE, whereas in other embodiments, the 5GC or it might use a default and/or already-existing PDU session.

Figure 10:
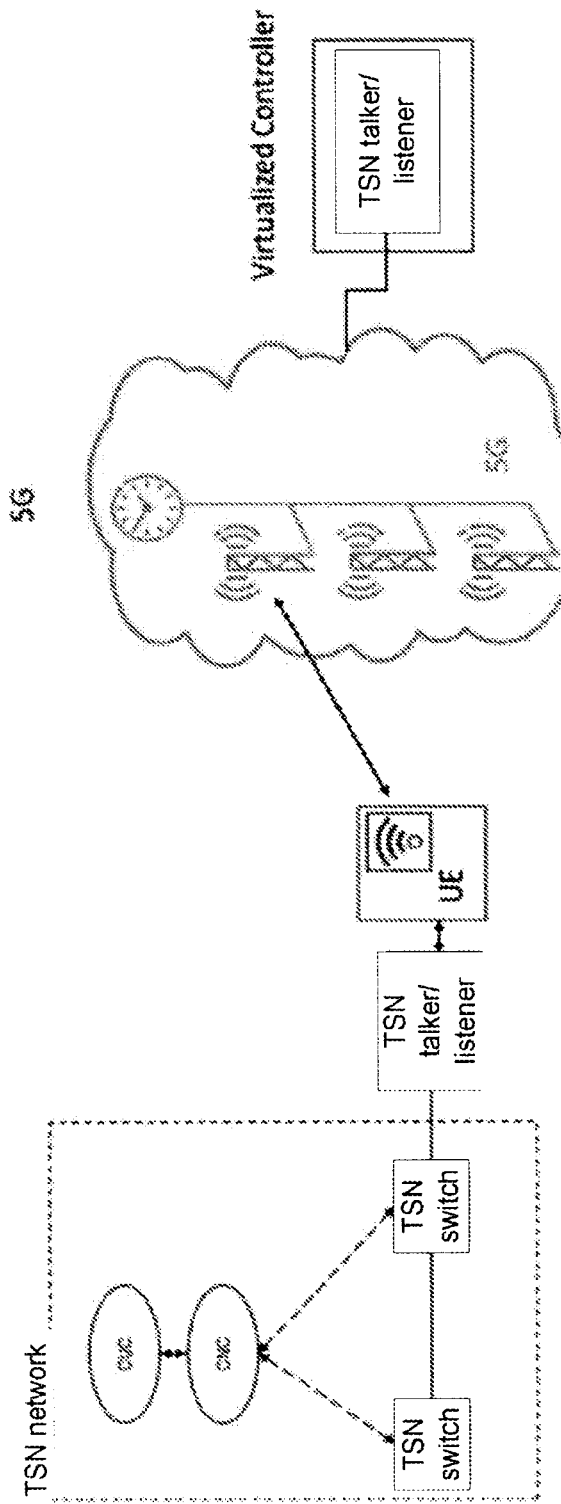
FIG. 10 is a block diagram illustrating an exemplary communication scenario between a TSN talker/listener unit and a virtualized controller via a 5G network, according to various exemplary embodiments of the present disclosure.

FIG. 10 is a block diagram illustrating another exemplary communication scenario between a TSN talker/listener unit and a virtualized controller via a 5G network, according to other exemplary embodiments of the present disclosure. In this scenario, a TSN network is connected to UE, which acts a gateway to connect a Talker/Listener end station over a wireless link to the 5G network. One challenge in this scenario is to facilitate timely transmission of the TSN stream packets from the UE to the gNB, according to the bounded latencies required by the schedule computed by a CNC in the TSN network.

Figure 11:
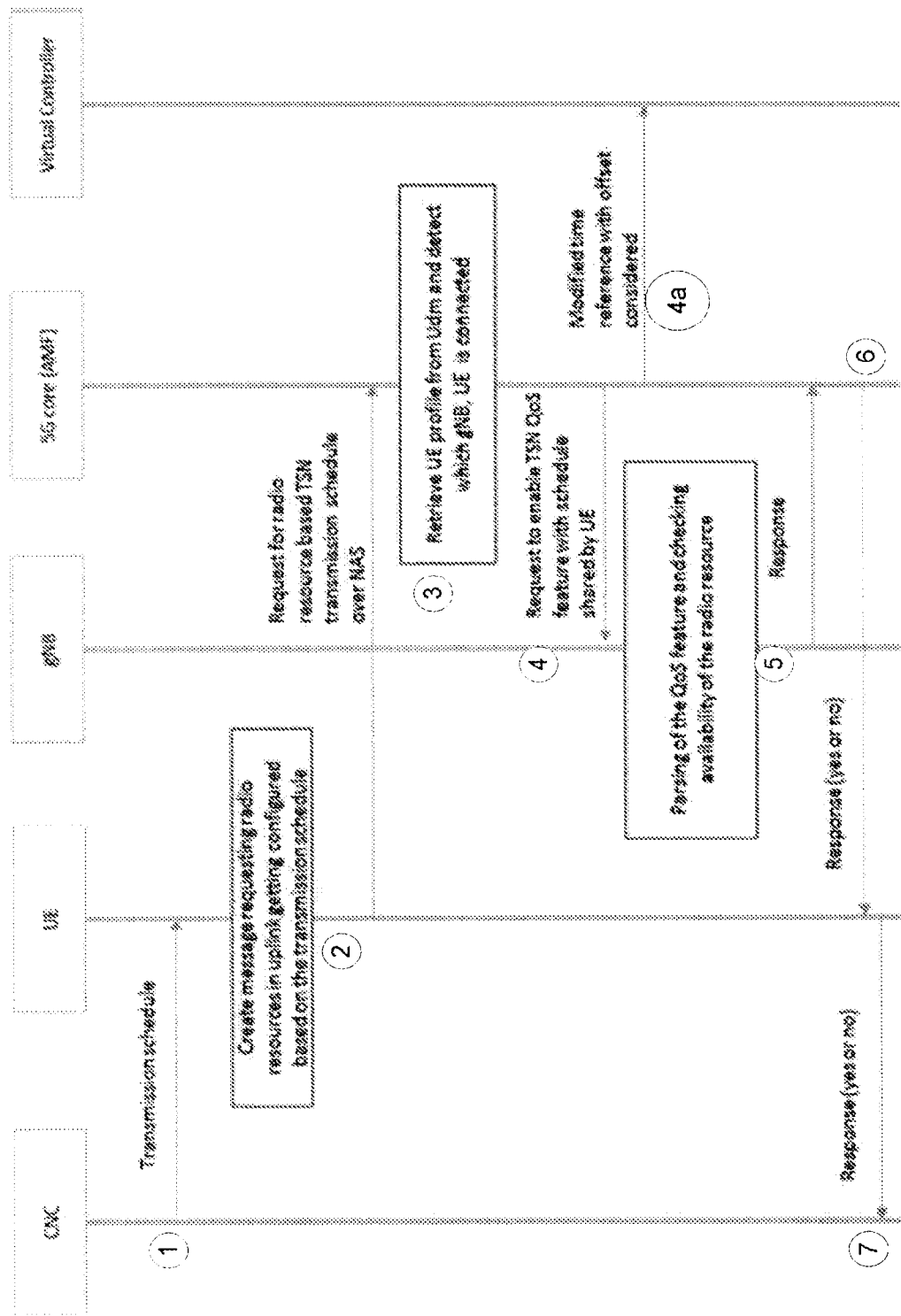
FIG. 11 shows a sequence diagram of an exemplary method and/or procedure for configuring timely delivery of TSN stream packets via the network configuration shown in FIG. 10, according to various exemplary embodiments of the present disclosure.

FIG. 11 shows a sequence diagram of an exemplary method and/or procedure for configuring timely delivery of TSN stream packets via the network configuration shown in FIG. 10, according to these exemplary embodiments. The numbered operations shown in FIG. 11 correspond to the description below. Even so, the numerical labels are used for illustration rather than to specify an order for the operations. In other words, the operations shown in FIG. 11 can be performed in different orders and can be combined and/or divided into other operations than shown in the figure.

In operation 21, the CNC calculates the transmission schedule based on the requirements provided by CUC, and sends it to the TSN interface of the 5G network, which is in this case the UE. In operation 22, the UE creates and sends a message requesting uplink (UL) radio resources according to the transmission schedule provided by the CNC, which can be included in the message. For example, the UE can send the message to the AMF in the 5GC. In operation 23, after receiving this message, the AMF retrieves the UE profile from a user data management (UDM) function in the 5GC and, based on this information, determines to which gNB(s) the UE is connected. In operation 24, the AMF sends a request to the gNB(s) to enable the TSN QoS feature towards the UE based on the transmission schedule, which can be included in the request. In some embodiments, the AMF can also send a modified time reference to the other Talker/Listener (e.g., a virtualized controller) connected to the 5G network (operation 24a).

In operation 25, the receiving gNB(s) can perform operations substantially similar to those described above with reference to operation 15 of FIG. 9, but with respect to the uplink rather than the downlink. After receiving the response from the gNB(s) sent in operation 25, the AMF can respond (operation 26) to the request for resources received from the UE in operation 22. Similar to operation 16 shown in FIG. 9, the AMF can translate the gNB response—which is based on per QoS flow mapping—to a traffic flow/TSN stream level of granularity, and provides a response in this format to the UE. In operation 27, the UE can forward this information to the CNC, in response to the requested transmission schedule received in operation 21. As discussed above in relation to certain embodiments illustrated by FIG. 9, if gNB declines the requested transmission schedule but offers an alternate time window that it can accept, the responses sent in operations 15-17 of FIG. 9 and operations 25-27 of FIG. 11 can include such an alternate time window, formatted and/or translated according to the protocols and/or requirements of the respective recipients.

As can be understood from the above description, these and other exemplary embodiments facilitate time-aware scheduling of transmissions in a cellular network (e.g., a 5G network) according to the time-sensitive (e.g., bounded latency) requirements of an external network, such as a TSN network. The exemplary embodiments facilitate such features through novel techniques for collecting (either via the UE or a network function such as an AMF) information about timing and periodicity associated with traffic provided an external network and forwarding such information to one or more base stations (e.g., gNBs) in the cellular network. In such case, the base station(s) can determine whether the external time-sensitive requirements of the requested traffic can be supported and, if so, utilize such information for scheduling uplink or downlink transmissions between the UE and the base station(s).

Figure 12:
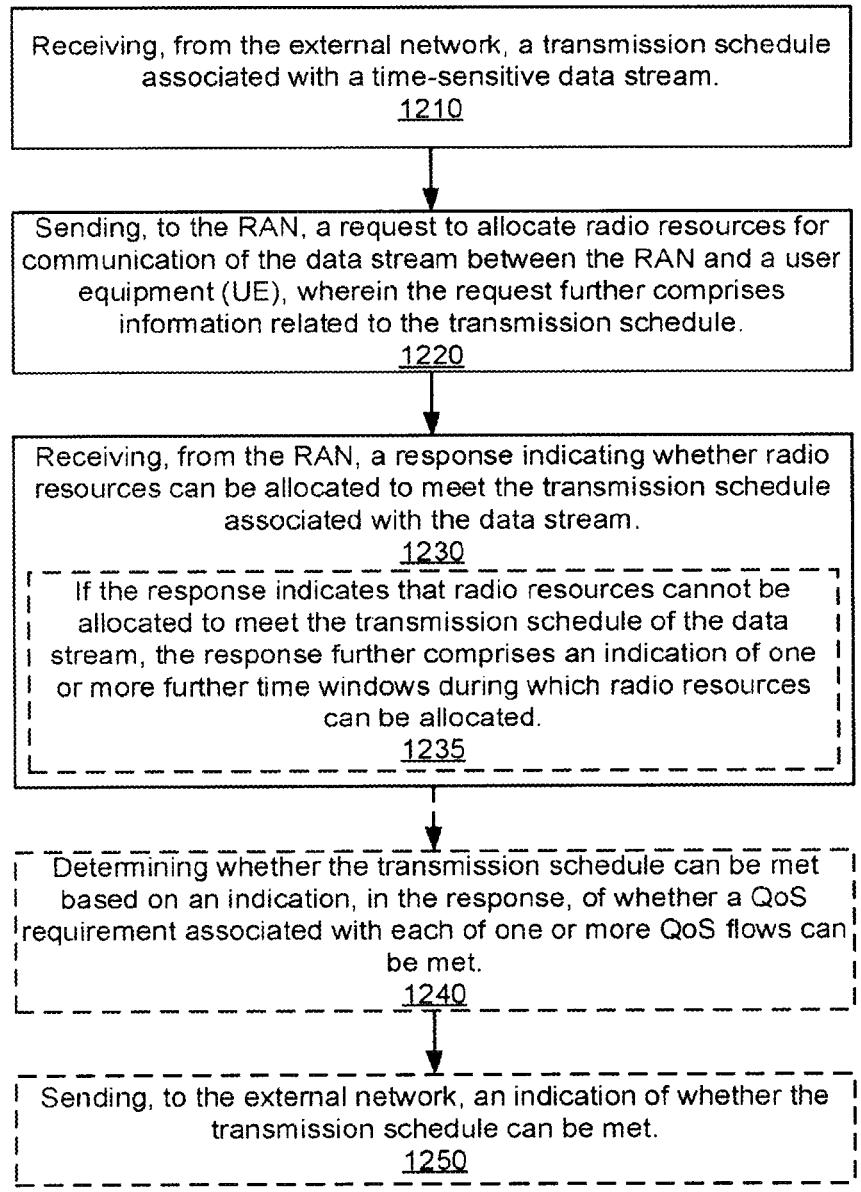
FIG. 12 is a flow diagram illustrating an exemplary method and/or procedure performed by a network node in a core network (e.g., 5GC), according to various exemplary embodiments of the present disclosure.

FIG. 12 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 12 can be implemented in a core network (e.g., 5GC) associated with the RAN (e.g., NG-RAN), such as by a core network node (e.g., AMF) shown in, or described in relation to, other figures herein. Furthermore, as explained below, the exemplary method and/or procedure shown in FIG. 12 can be utilized cooperatively with the exemplary method and/or procedures shown in FIGS. 13 and/or 14 (described below), to provide various exemplary benefits described herein. Although FIG. 12 shows blocks in a particular order, this order is merely exemplary, and the operations of the exemplary method and/or procedure can be performed in a different order than shown in FIG. 12 and can be combined and/or divided into blocks having different functionality. Optional operations are represented by dashed lines.

The exemplary method and/or procedure illustrated in FIG. 12 can include the operations of block 1210, in which the network node can receive, from the external network, a transmission schedule associated with a time-sensitive data stream. Herein, a time-sensitive data stream can be a data stream of a Time-Sensitive Network (TSN). Thus, in some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary method and/or procedure can also include the operations of block 1220, in which the network node can send, to the RAN, a request to allocate radio resources for communication of the data stream between the RAN and a user equipment (UE), wherein the request further comprises information related to the transmission schedule. In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary method and/or procedure can also include the operations of block 1230, in which the network node can receive, from the RAN, a response indicating whether radio resources can be allocated to meet the transmission schedule associated with the data stream. In some embodiments, according to sub-block 1235, if the response indicates that radio resources cannot be allocated to meet the transmission schedule of the data stream, the response further comprises an indication of one or more further time windows during which radio resources can be allocated.

In some embodiments, the response can indicate whether the QoS requirement associated with each of the QoS flows can be met. In such embodiments, the exemplary method and/or procedure can also include the operations of block 1240, in which the network node can determine whether the transmission schedule can be met based on the indication of whether the QoS requirement associated with each of the QoS flows can be met. In some embodiments, the exemplary method and/or procedure can also include the operations of block 1250, in which the network node can send, to the external network, an indication of whether the transmission schedule can be met.

In some embodiments, the method can be performed by an access management function (AMF) in a 5G core network (5GC). In some embodiments, the transmission schedule can be received from the external network; and the radio resources are for downlink communication from the RAN to the UE. In some embodiments, the transmission schedule is received from the UE; and the radio resources are for uplink communication from the UE to the RAN.

Figure 13:
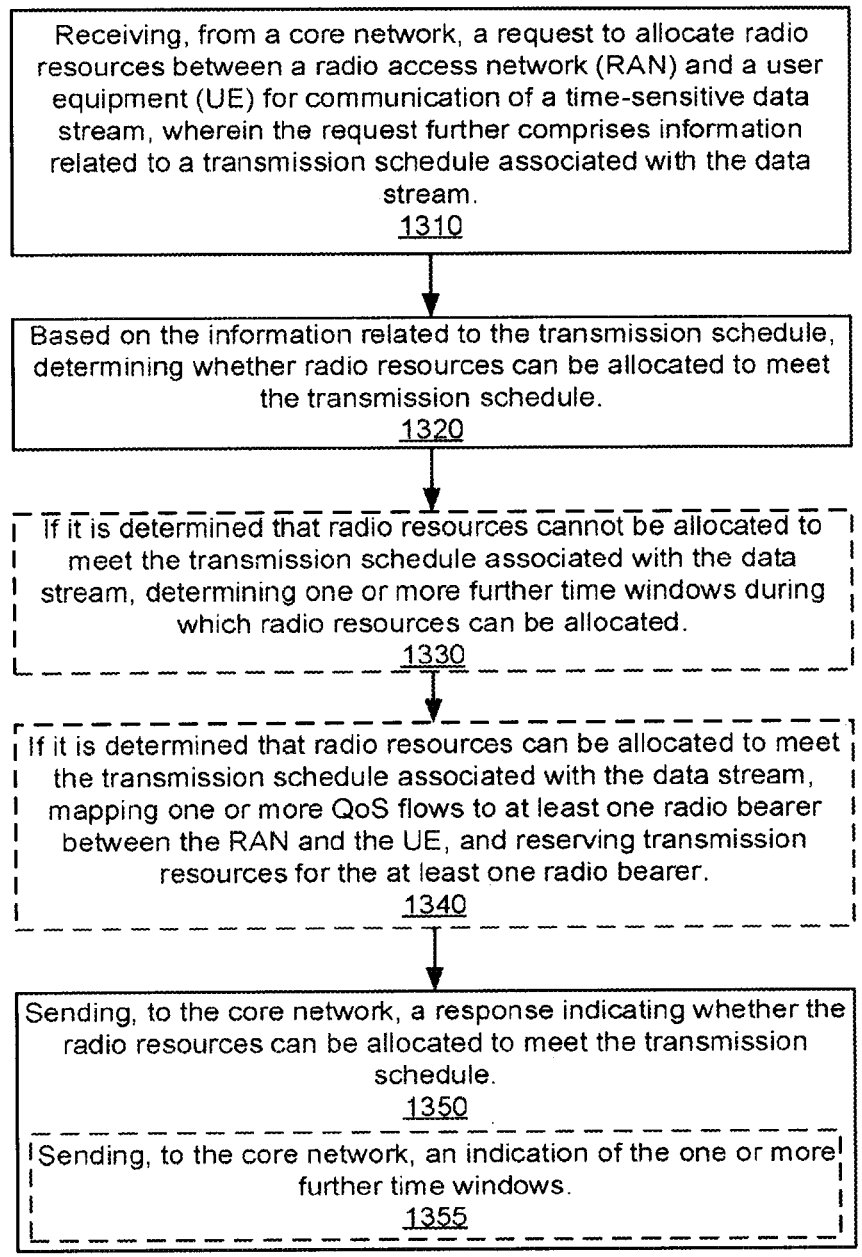
FIG. 13 is a flow diagram illustrating an exemplary method and/or procedure performed by a network node in a radio access network (e.g., NG-RAN), according to various exemplary embodiments of the present disclosure.

FIG. 13 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 13 can be implemented in a RAN (e.g., NG-RAN) associated with a core network (e.g., 5GC), such as by a RAN node (e.g., gNB) shown in, or described in relation to, other figures herein. Furthermore, as explained below, the exemplary method and/or procedure shown in FIG. 13 can be utilized cooperatively with the exemplary method and/or procedures shown in FIGS. 12 and/or 14 (described above and below), to provide various exemplary benefits described herein. Although FIG. 13 shows blocks in a particular order, this order is merely exemplary, and the operations of the exemplary method and/or procedure can be performed in a different order than shown in FIG. 13 and can be combined and/or divided into blocks having different functionality. Optional operations are represented by dashed lines.

The exemplary method and/or procedure illustrated in FIG. 13 can include the operations of block 1310, in which the network node can receive, from the core network, a request to allocate radio resources between the RAN and a user equipment (UE) for communication of a time-sensitive data stream, wherein the request further comprises information related to a transmission schedule associated with the data stream. In some embodiments, the external network comprises a Time-Sensitive Network (TSN); and the data stream comprises a TSN stream.

In some embodiments, the information related to the transmission schedule includes one or more of the following: an identifier of the UE; identifiers of one or more quality-of-service (QoS) flows associated with the data stream; and a QoS requirement associated with each of the QoS flows. In some embodiments, each QoS requirement can comprise one or more time windows during which the data stream is required to be transmitted. In some embodiments, each QoS requirement comprises an initial time window and a periodicity that identifies subsequent time windows.

The exemplary method and/or procedure illustrated in FIG. 13 can also include the operations of block 1320, in which the network node can, based on the information related to the transmission schedule, determine whether radio resources can be allocated to meet the transmission schedule. In some embodiments, determining whether radio resources can be allocated to meet the transmission schedule can be further based on one or more of the following: resources needed for current or estimated traffic load, capabilities of the UE, channel quality between the RAN and the UE, and need for additional guaranteed resources to be allocated for the UE.

In some embodiments, if it is determined in block 1320 that radio resources cannot be allocated to meet the transmission schedule associated with the data stream, the exemplary method and/or procedure includes the operations of block 1330, where the network node can determine one or more further time windows during which radio resources can be allocated. In some embodiments, if it is determined in block 1320 that radio resources can be allocated to meet the transmission schedule associated with the data stream, the exemplary method and/or procedure includes the operations of block 1340, where the network node can map the one or more QoS flows to at least one radio bearer between the RAN and the UE, and reserve transmission resources for the at least one radio bearer.

The exemplary method and/or procedure also includes the operations of block 1350, in which the network node can send, to the core network, a response indicating whether the radio resources can be allocated to meet the transmission schedule. In some embodiments, if it is determined in block 1320 that radio resources cannot be allocated to meet the transmission schedule, the response sent in block 1350 can also include an indication of the one or more further time windows determined in optional subblock 1330. This is illustrated by optional subblock 1355.

Figure 14:
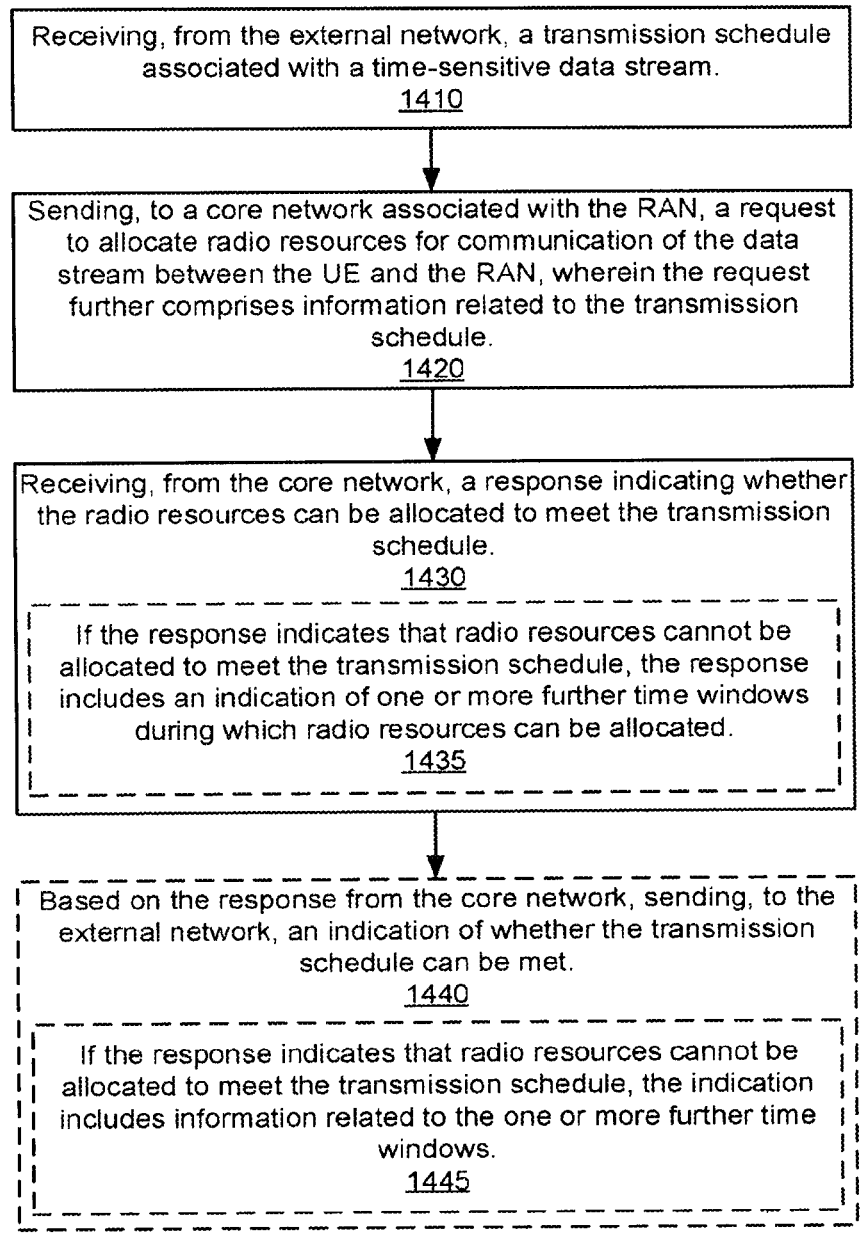
FIG. 14 is a flow diagram illustrating an exemplary method and/or procedure performed by user equipment (UE), according to various exemplary embodiments of the present disclosure.

FIG. 14 is a flow diagram illustrating an exemplary method and/or procedure for scheduling resources in a radio access network (RAN) according to a transmission schedule associated with an external network, according to various exemplary embodiments of the present disclosure. The exemplary method and/or procedure shown in FIG. 14 can be implemented, for example, by a user equipment (UE, e.g., wireless device, IoT device, M2M device, etc.) in communication with a RAN (e.g., NG-RAN) that is associated with a core network (e.g., 5GC), such as shown in, or described in relation to, other figures herein. Furthermore, as explained below, the exemplary method and/or procedure shown in FIG. 14 can be utilized cooperatively with the exemplary method and/or procedures shown in FIGS. 12 and/or 13 (described above), to provide various exemplary benefits described herein. Although FIG. 14 shows blocks in a particular order, this order is merely exemplary, and the operations of the exemplary method and/or procedure can be performed in a different order than shown in FIG. 14 and can be combined and/or divided into blocks having different functionality. Optional operations are represented by dashed lines.

The exemplary method and/or procedure illustrated in FIG. 14 can include the operations of block 1410, in which the UE can receive, from the external network, a transmission schedule associated with a time-sensitive data stream. In some embodiments, the external network comprises a Time-Sensitive Network (TSN) such as described in the IEEE standards discussed herein. In such embodiments, the data stream can comprise a TSN stream, e.g., associated with a Talker and/or Listener end station in the TSN. In such embodiments, the transmission schedule can comprise cycle times and gate control lists for one or more traffic classes comprising the TSN stream.

The exemplary method and/or procedure can also include the operations of block 1420, in which the UE can send, to a core network associated with the RAN, a request to allocate radio resources for communication of the data stream between the UE and the RAN, wherein the request further comprises information related to the transmission schedule. In some embodiments, the information related to the transmission schedule comprises the transmission schedule.

The exemplary method and/or procedure can also include the operations of block 1430, in which the UE can receive, from the core network, a response indicating whether radio resources can be allocated to meet the transmission schedule associated with the data stream. In some embodiments, if the response from the core network indicates that radio resources cannot be allocated to meet the transmission schedule of the data stream, the response further comprises an indication of one or more further time windows during which radio resources can be allocated. This is illustrated by optional subblock 1435. In some embodiments, the request (block 1420) can be sent to, and the response (block 1430) can be received from, an access management function (AMF) in a 5GC.

In some embodiments, the exemplary method and/or procedure can also include the operations of block 1440, in which the UE can send, to the external network, an indication of whether the transmission schedule can be met. In some embodiments, if the response received in block 1430 comprises an indication of one or more further time windows during which radio resources can be allocated (subblock 1435), the indication sent to the external network further includes information related to the one or more further time windows. This is illustrated by optional subblock 1445.

Figure 15:
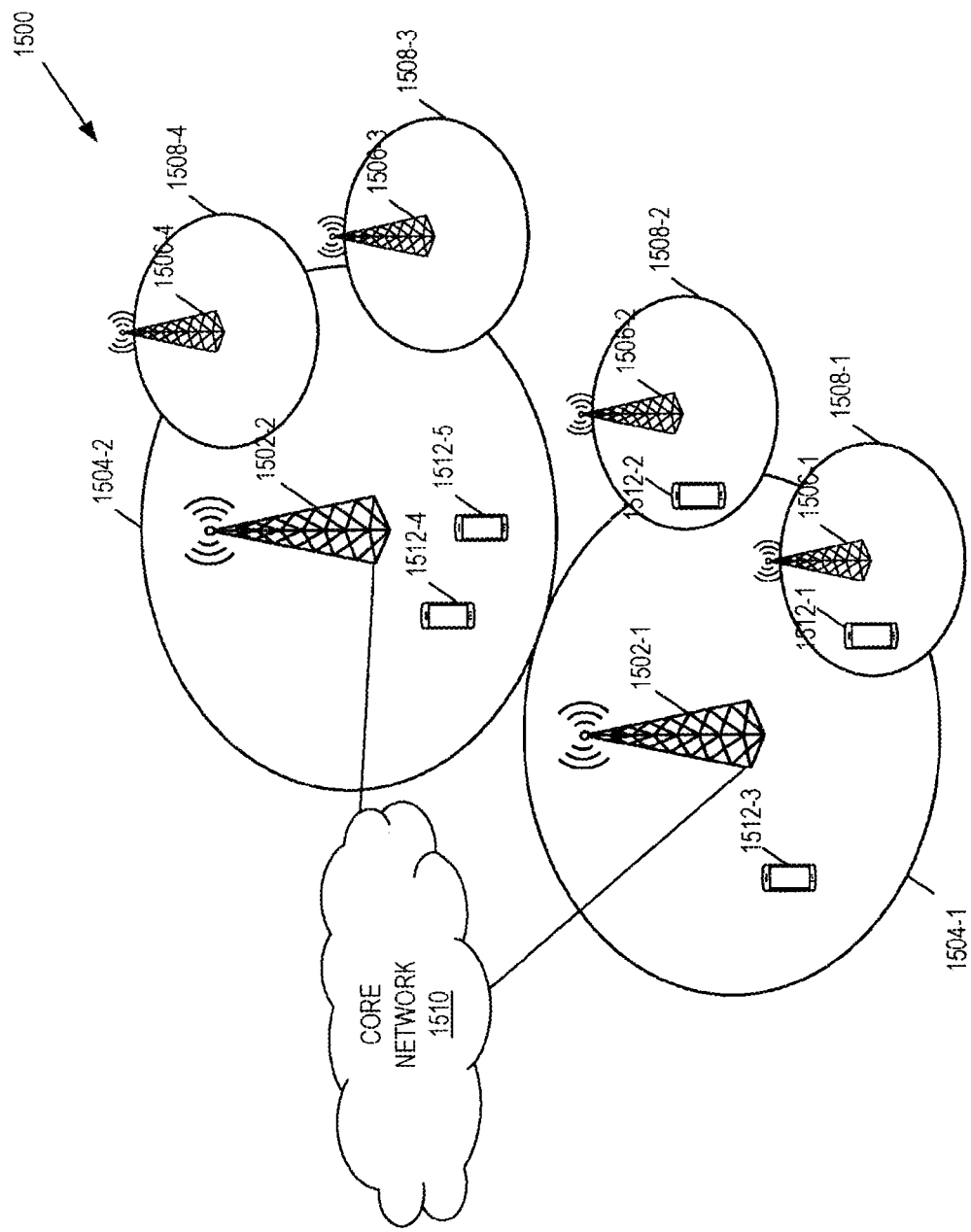
FIGS. 15-17 are block diagrams of exemplary communications systems, networks, and/or network nodes configure in various ways, according to various exemplary embodiments of the present disclosure.

FIG. 15 illustrates one example of a cellular communications system and/or network, comprising various devices and/or systems usable to implement any of the exemplary methods described above. In the embodiments described herein, the cellular communications network 1500 is a 5G NR network. In this example, the cellular communications network 1500 includes base stations 1502-1 and 1502-2, which in LTE are referred to as eNBs and in 5G NR are referred to as gNBs, controlling corresponding macro cells 1504-1 and 1504-2. The base stations 1502-1 and 1502-2 are generally referred to herein collectively as base stations 1502 and individually as base station 1502. Likewise, the macro cells 1504-1 and 1504-2 are generally referred to herein collectively as macro cells 1504 and individually as macro cell 1504.

The cellular communications network 1500 can also include some number of low power nodes 1506-1 through 1506-4 that control corresponding small cells 1508-1 through 1508-4. The low power nodes 1506-1 through 1506-4 can be small base stations (such as pico or femto base stations), Remote Radio Heads (RRHs), or the like. Notably, while not illustrated, one or more of the small cells 1508-1 through 1508-4 may alternatively be provided by the base stations 1502. The low power nodes 1506-1 through 1506-4 are generally referred to herein collectively as low power nodes 1506 and individually as low power node 1506.

Likewise, the small cells 1508-1 through 1508-4 are generally referred to herein collectively as small cells 1508 and individually as small cell 1508. The base stations 1502 (and optionally the low power nodes 1506) are connected to a core network 6150.

The base stations 1502 and the low power nodes 1506 provide service to wireless devices 1512-1 through 1512-5 in the corresponding cells 1504 and 1508. The wireless devices 1512-1 through 1512-5 are generally referred to herein collectively as wireless devices 1512 and individually as wireless device 1512. The wireless devices 1512 are also sometimes referred to herein as UEs. Wireless devices 1512 can take on various forms, including those compatible with MTC and/or NB-IoT.

Figure 16:
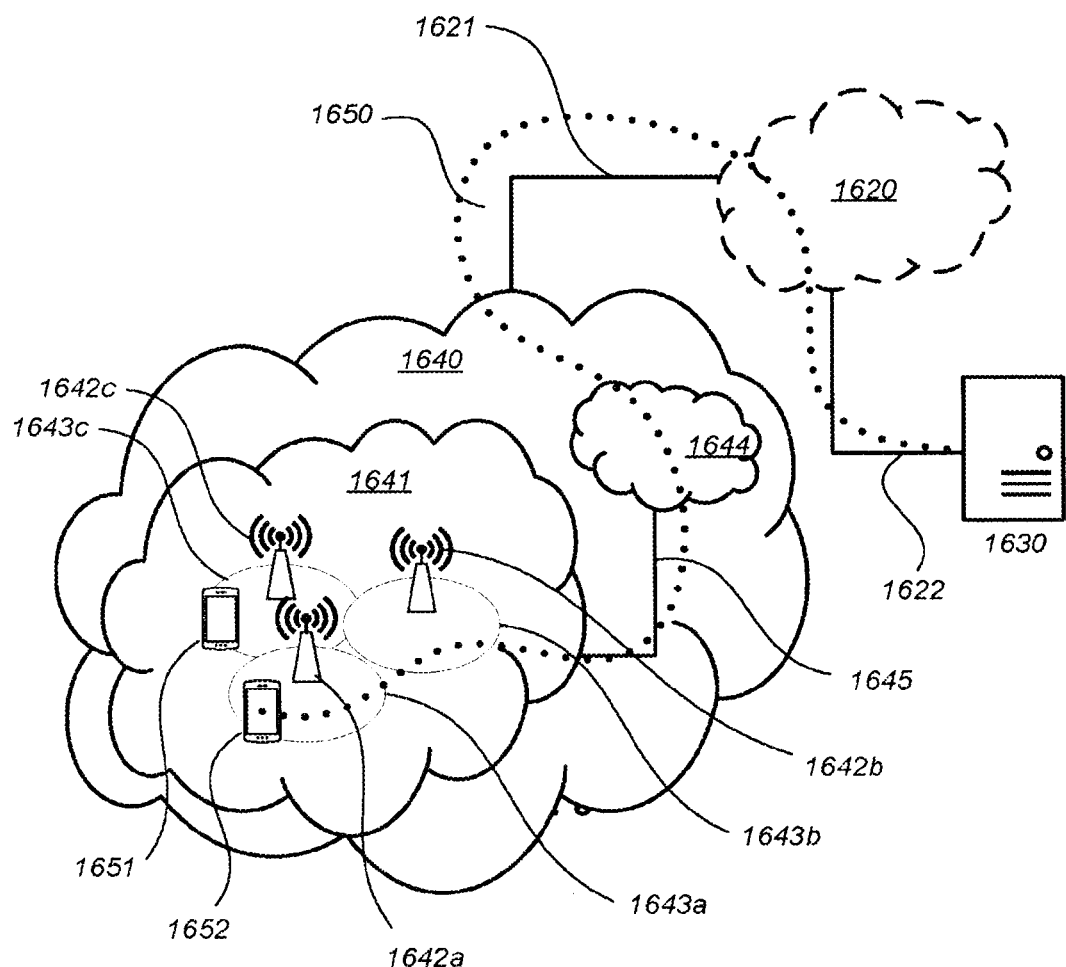

FIG. 16 shows another exemplary communication system and/or network in accordance with various embodiments of the present disclosure. The system includes a telecommunication network 1640, such as a 3GPP-type cellular network, which comprises an radio access network (RAN) 1641 (e.g., NR RAN) and a core network 1644 (e.g., 5GC). RAN 1641 comprises a plurality of base stations 1642a, 1642b, 1642c, such as gNBs or other types of wireless access points, each defining a corresponding coverage area 1643a, 1643b, 1643c. Each base station 1642a, 1642b, 1642c is connectable to the core network 1644 over a wired or wireless connection 1645. A first user equipment (UE) 1651 located in coverage area 1643c is configured to wirelessly connect to, or be paged by, the corresponding base station 1642c. A second UE 1652 in coverage area 1643a is wirelessly connectable to the corresponding base station 1642a. While a plurality of UEs 1651, 1652 are illustrated in this example, the disclosed embodiments are equally applicable to a situation where a sole UE is in the coverage area or where a sole UE is connecting to the corresponding base station 1642.

The telecommunication network 1640 can be connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1640 and the host computer 1630 may extend directly from the core network 1644 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 can facilitate connectivity between one or more of UEs 1651, 1652 and host computer 1630. The connectivity may be described as an over-the-top (OTT) connection 1650. Host computer 1630 and connected UEs 1651, 1652 are configured to communicate data and/or signaling via OTT connection 1650, using access network 1641, core network 1644, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, a base station 1642 may not or need not be informed about the past routing of an incoming downlink communication with data originating from a host computer 1630 to be forwarded (e.g., handed over) to connected UE 1651. Similarly, base station 1642 need not be aware of the future routing of an outgoing uplink communication originating from UE 1651 towards host computer 1630.

Example implementations, in accordance with an embodiment, of the UE, base station, and host computer discussed herein can also be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 can provide user data which is transmitted using the OTT connection 1750.

The communication system 1700 further includes a base station 1720 provided in a telecommunication system and comprising hardware 1725 enabling it to communicate with the host computer 1710 and with the UE 1730. The hardware 1725 may include a communication interface 1726 for setting up and maintaining a wired or wireless connection with an interface of a different communication device of the communication system 1700, as well as a radio interface 1727 for setting up and maintaining at least wireless connection 1770 with the UE 1730 located in a coverage area (not shown in FIG. 8) served by the base station 1720. The communication interface 1726 can be configured to facilitate a connection 1760 to the host computer 1710. The connection 1760 can be direct or it can pass through a core network (not shown in FIG. 17) of the telecommunication system, and/or through one or more intermediate networks outside the telecommunication system. In the embodiment shown, the hardware 1725 of the base station 1720 can also include processing circuitry 1728, which can comprise one or more programmable processors, application-specific integrated circuits, field programmable gate arrays or combinations of these (not shown) adapted to execute instructions. The base station 1720 can also include software 1721 stored internally or accessible via an external connection.

The communication system 1700 further includes the UE 1730 already referred to. The hardware 1735 of UE 1730 can include a radio interface 1737 configured to set up and maintain a wireless connection 1770 with a base station serving a coverage area (e.g., a cell) in which the UE 1730 is currently located. The hardware 1735 of the UE 1730 can also include processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
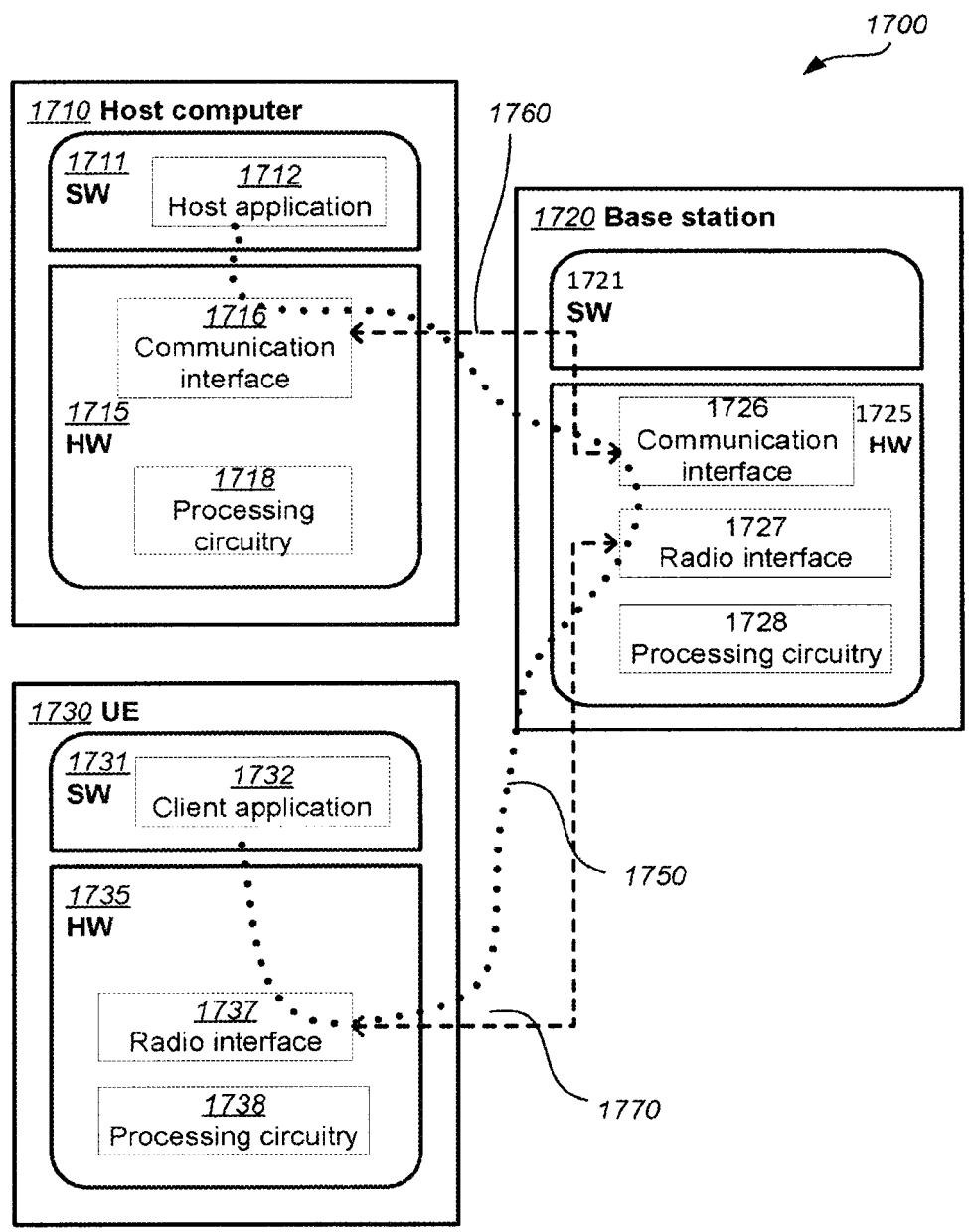

It is noted that the host computer 1710, base station 1720 and UE 1730 illustrated in FIG. 17 may be identical to the host computer 1630, one of the base stations 1612*a*, 1612*b*, 1612*c* and one of the UEs 1651, 1652 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the use equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further make decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure. One or more of the various embodiments can be used to improve the performance of OTT services provided to the UE 1730 using the OTT connection 1750, in which the wireless connection 1770 forms the last segment. For example, enabling advance notification of a user equipment (UE) of changes to an access network's (e.g., base station 1720's) non-compliance with a quality-of-service (QoS) guarantee for a data flow between the UE and an application server can improve the performance and/or operational efficiency of such applications, particularly with respect to safe operation. These improvements can be experienced by RAN users (e.g., UEs), for example, as an absence of critical application failures.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or 'dummy' messages, using the OTT connection 1750 while it monitors propagation times, errors etc.

FIG. 18 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 18 will be included in this section. In a first step 1800 of the method, the host computer provides user data. In an optional substep 1802 of the first step 1800, the host computer provides the user data by executing a host application. In a second step 1804, the host computer initiates a transmission carrying the user data to the UE. In an optional third step 1806, the base station transmits to the UE the user data which was carried in the transmission that the host computer initiated, in accordance with the teachings of the embodiments described throughout this disclosure. In an optional fourth step 1808, the UE executes a client application associated with the host application executed by the host computer.

FIG. 19 is a flowchart illustrating a method implemented in a communication system, in accordance with one or more embodiments. The communication system includes a host computer, a base station and a UE which may be those described with reference to other figures herein. For simplicity of the present disclosure, only drawing references to FIG. 19 will be included in this section. In a first step 1900 of the method, the host computer provides user data. In an optional substep (not shown), the host computer provides the user data by executing a host application. In a second step 1902, the host computer initiates a transmission carrying the user data to the UE. The transmission may pass via the base station, in accordance with the teachings of the embodiments described throughout this disclosure. In an optional third step 1904, the UE receives the user data carried in the transmission.

Figures 20, 21:
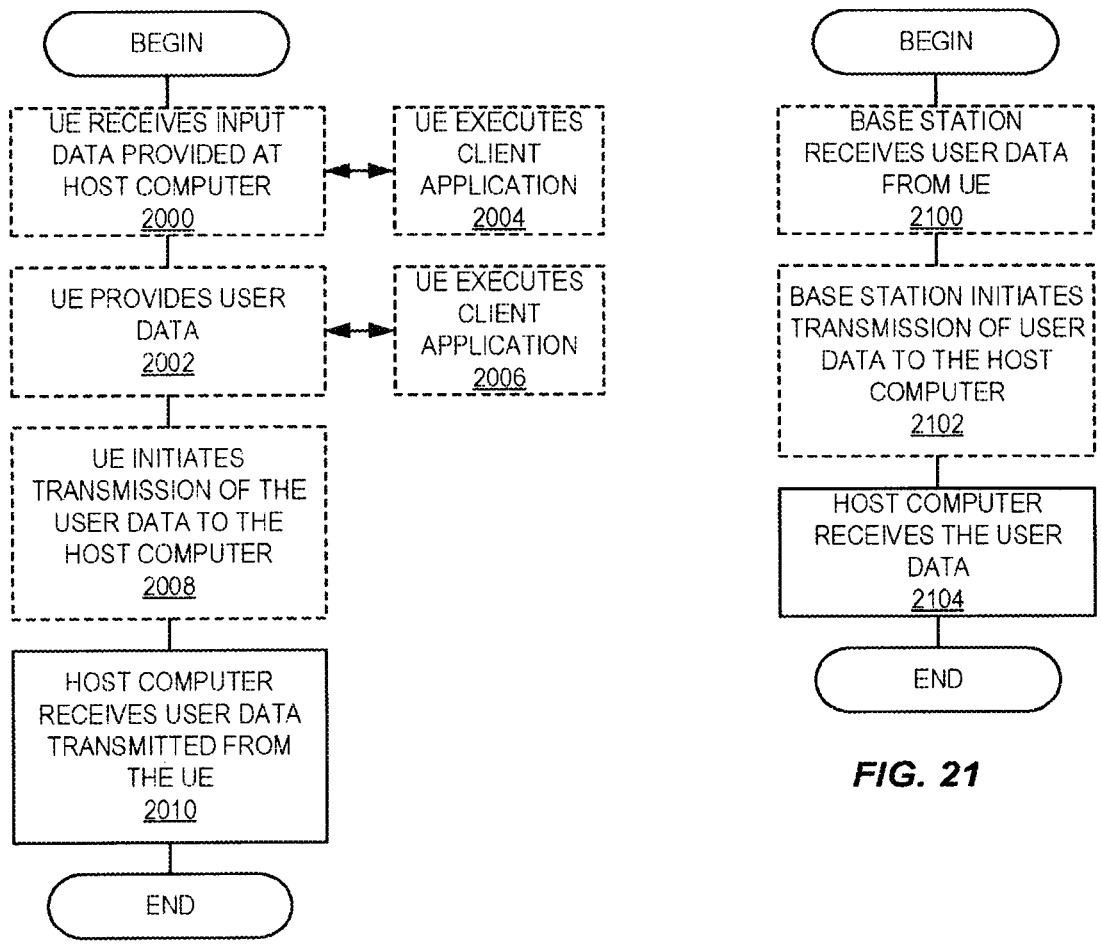

FIG. 20 is a flowchart illustrating a method implemented in a communication system, in accordance with one or more embodiments. The communication system includes a host computer, a base station and a UE which may be those described with reference to other figures herein. For simplicity of the present disclosure, only drawing references to FIG. 20 will be included in this section. In an optional first step 2000 of the method, the UE receives input data provided by the host computer. Additionally, or alternatively, in an optional second step 2002, the UE provides user data. In an optional substep 2006 of the second step 2020, the UE provides the user data by executing a client application. In a further optional substep 2004 of the first step 2000, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2008, transmission of the user data to the host computer. In a fourth step 2010 of the method, the host computer receives the user data transmitted from the UE, in accordance with the teachings of the embodiments described throughout this disclosure.

FIG. 21 is a flowchart illustrating a method implemented in a communication system, in accordance with one or more embodiments. The communication system includes a host computer, a base station and a UE which may be those described with reference to other figures herein. For simplicity of the present disclosure, only drawing references to FIG. 21 will be included in this section. In an optional first step 2100 of the method, in accordance with the teachings of the embodiments described throughout this disclosure, the base station receives user data from the UE. In an optional second step 2102, the base station initiates transmission of the received user data to the host computer. In a third step 2104, the host computer receives the user data carried in the transmission initiated by the base station.

Figure 22:
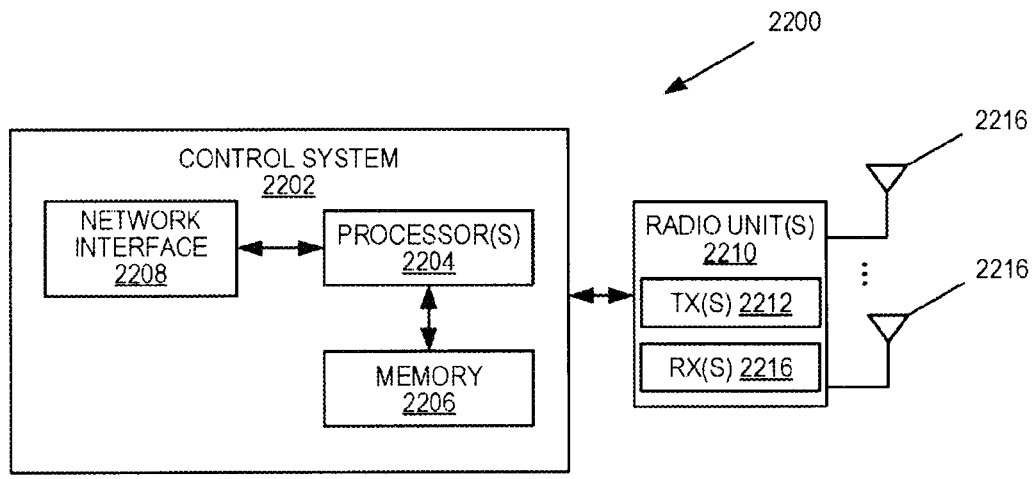
FIGS. 22-24 are block diagrams of exemplary radio access nodes configured in various ways according to various exemplary embodiments of the present disclosure.

FIG. 22 is a schematic block diagram of a radio access node 2200 according to some embodiments of the present disclosure. The radio access node 2200 may be, for example, a base station (e.g., gNB or eNB) described herein in relation to one or more other figures. As illustrated, the radio access node 2200 includes a control system 2202 that further includes one or more processors 2204 (e.g., Central Processing Units (CPUs), Application Specific Integrated Circuits (ASICs), Field Programmable Gate Arrays (FPGAs), and/or the like), memory 2206, and a network interface 2208. In addition, the radio access node 2200 includes one or more radio units 2210 that each includes one or more transmitters 2212 and one or more receivers 2214 coupled to one or more antennas 2216. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of a radio access node 2200 as described herein. In some embodiments, the function(s) are implemented in software that is stored, e.g., in the memory 2206 and executed by the one or more processors 2204.

Figure 23:
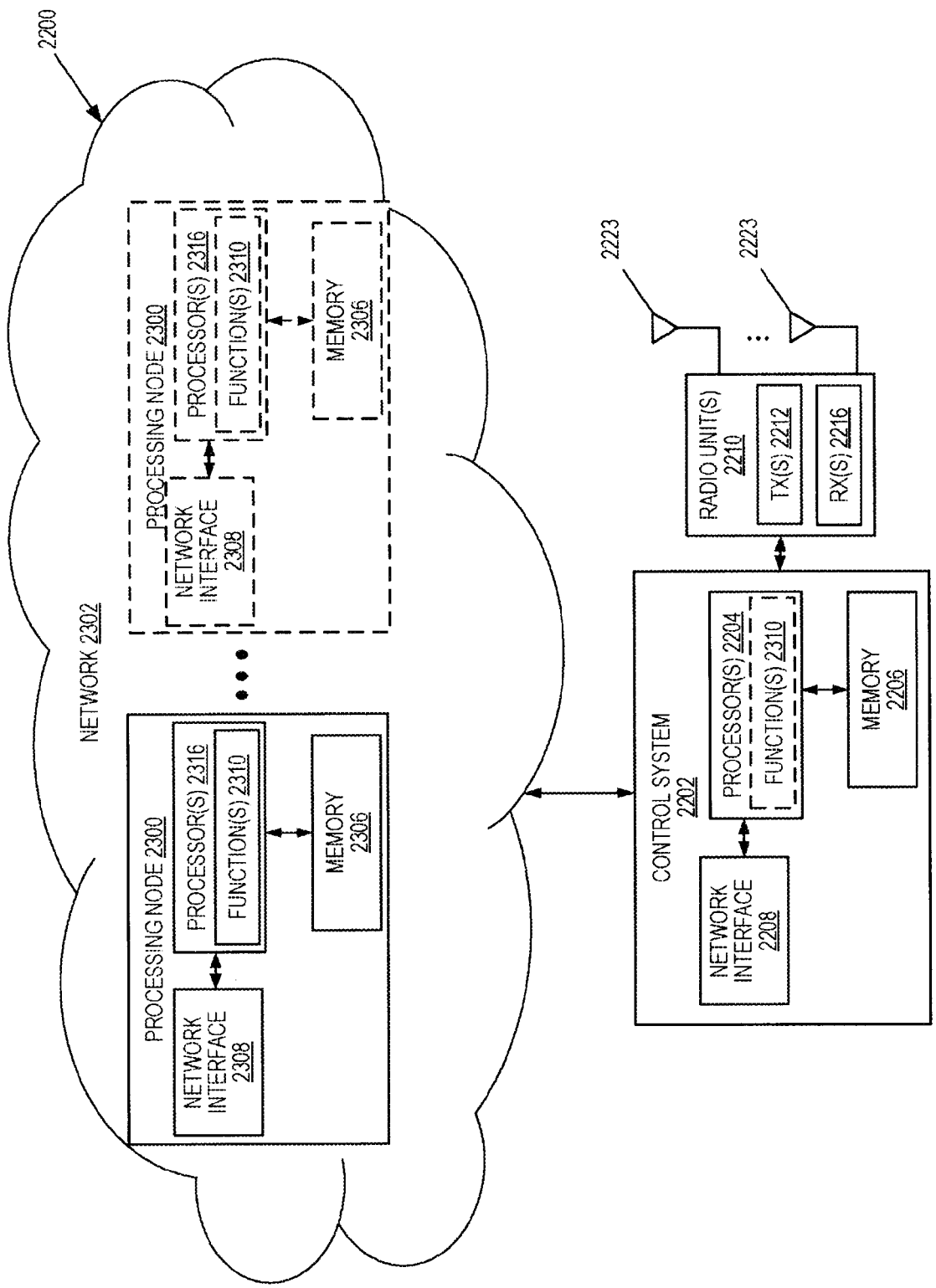

FIG. 23 is a schematic block diagram that illustrates a virtualized embodiment of the radio access node 2200 according to some embodiments of the present disclosure. This discussion is equally applicable to other types of network nodes. Further, other types of network nodes may have similar virtualized architectures.

As used herein, a "virtualized" radio access node is an implementation of the radio access node 2200 in which at least a portion of the functionality of node 2200 is implemented as a virtual component(s) (e.g., via a virtual machine(s) executing on a physical processing node(s) in a network(s)). As illustrated, in this example, the radio access node 2200 includes the control system 2202 that includes the one or more processors 2204 (e.g., CPUs, ASICs, FPGAs, and/or the like), the memory 2206, and the network interface 2208 and the one or more radio units 2210 that each includes the one or more transmitters 2212 and the one or more receivers 2214 coupled to the one or more antennas 2223, as described above. The control system 2202 is connected to the radio unit(s) 2210 via, for example, an optical cable or the like. The control system 2202 can be connected to one or more processing nodes 2300 coupled to or included as part of a network(s) 2302 via the network interface 2308. Each processing node 2300 can include one or more processors 2310 (e.g., CPUs, ASICs, FPGAs, and/or the like), memory 2306, and a network interface 2308.

In this example, functions 2310 of the radio access node 2200 described herein are implemented at the one or more processing nodes 2300 or distributed across the control system 2202 and the one or more processing nodes 2300 in any desired manner. In some particular embodiments, some or all of the functions 2310 of the radio access node 2200 described herein are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of radio access node 2200 or a node (e.g., a processing node 2300) implementing one or more of the functions 2310 of the radio access node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
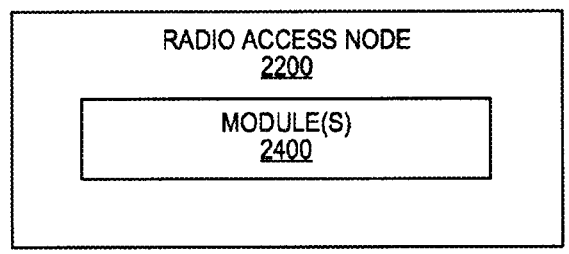

FIG. 24 is a schematic block diagram of the radio access node 2200 according to some other embodiments of the present disclosure. The radio access node 2200 includes one or more modules 2400, each of which is implemented in software. The module(s) 2400 provide the functionality of the radio access node 2200 described herein. This discussion is equally applicable to the processing node 2300 of FIG. 23 where the modules 2400 may be implemented and/or distributed across one or more processing nodes 2300 and/or control system 2202.

Figure 25:
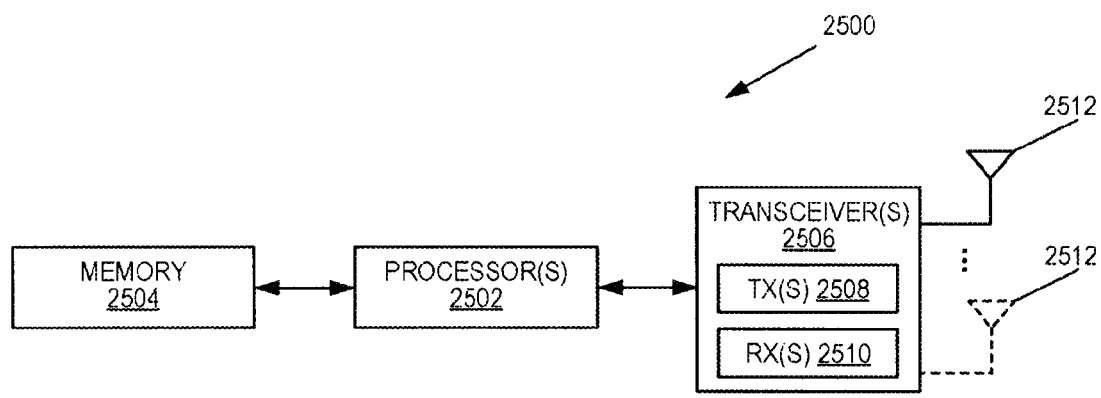
FIGS. 25-26 are block diagrams of exemplary wireless devices or UEs configured in various ways, according to various exemplary embodiments of the present disclosure.

FIG. 25 is a schematic block diagram of a UE 2500 according to some embodiments of the present disclosure. As illustrated, the UE 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. In some embodiments, the functionality of the UE 2500 described above may be fully or partially implemented in software that is, e.g., stored in the memory 2504 and executed by the processor(s) 2502.

In some embodiments, a computer program including instructions which, when executed by at least one processor, causes the at least one processor to carry out the functionality of the UE 2500 according to any of the embodiments described herein is provided. In some embodiments, a carrier comprising the aforementioned computer program product can be provided. The carrier can be one of an electronic signal, an optical signal, a radio signal, or a computer readable storage medium (e.g., a non-transitory computer readable medium such as a physical memory).

Figure 26:
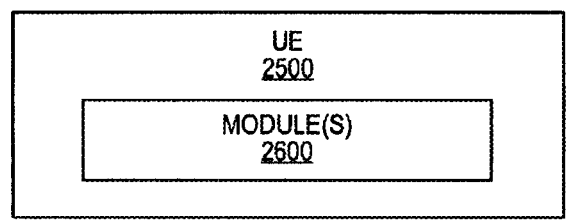

FIG. 26 is a schematic block diagram of the UE 2500 according to some other embodiments of the present disclosure. In these embodiments, UE 2500 can include one or more modules 2600, each of which is implemented in software. Module(s) 2600 can provide at least a portion of the functionality of UE 2500 described hereinabove.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Example embodiments of the techniques and apparatus described herein include, but are not limited to, the following enumerated examples:

1. A method, performed in a core network associated with a radio access network (RAN), for scheduling resources in the RAN according to a transmission schedule associated with an external network, the method comprising:
   receiving, from the external network, a transmission schedule associated with a time-sensitive data stream;
   sending, to the RAN, a request to allocate radio resources for communication of the data stream between the RAN and a user equipment (UE), wherein the request further comprises information related to the transmission schedule; and
   receiving, from the RAN, a response indicating whether radio resources can be allocated to meet the transmission schedule associated with the data stream.
2. The method of embodiment 1, wherein:
   the external network comprises a Time-Sensitive Network (TSN);
   the data stream comprises a TSN stream; and
   the transmission schedule comprises cycle times and gate control lists for one or more traffic classes comprising the TSN stream.
3. The method of any of embodiments 1-2, wherein the information related to the transmission schedule includes one or more of the following:
   an identifier of the UE;
   identifiers of one or more quality-of-service (QoS) flows associated with the data stream; and
   a QoS requirement associated with each of the QoS flows.
4. The method of embodiment 1-3, wherein each QoS requirement comprises one or more time windows during which the data stream is required to be transmitted.
5. The method of any of embodiments 3-4, wherein each QoS requirement comprises an initial time window and a periodicity that identifies subsequent time windows.
6. The method of any of embodiments 4-5, wherein if the response indicates that radio resources cannot be allocated to meet the transmission schedule of the data stream, the response further comprises an indication of one or more further time windows during which radio resources can be allocated.
7. The method of any of embodiments 1-6, wherein the response indicates whether the QoS requirement associated with each of the QoS flows can be met, and further comprising determining whether the transmission schedule can be met based on the indication of whether the QoS requirement associated with each of the QoS flows can be met.
8. The method of any of embodiments 1-7, further comprising sending, to the external network, an indication of whether the transmission schedule can be met.
9. The method of any of embodiments 1-8, wherein the method is performed by an access management function (AMF) in a 5G core network (5GC).
10. The method of any of embodiments 1-9, wherein:
    the transmission schedule is received from the external network; and
    the radio resources are for downlink communication from the RAN to the UE.
11. The method of any of embodiments 1-9, wherein:
    the transmission schedule is received from the UE; and
    the radio resources are for uplink communication from the UE to the RAN.
12. A method, performed in a radio access network (RAN) associated with a core network, for scheduling resources in the RAN according to a transmission schedule associated with an external network, the method comprising:
    receiving, from the core network, a request to allocate radio resources between the RAN and a user equipment (UE) for communication of a time-sensitive data stream, wherein the request further comprises information related to a transmission schedule associated with the data stream; and
    based on the information related to the transmission schedule, determining whether radio resources can be allocated to meet the transmission schedule; and
    sending, to the core network, a response indicating whether the radio resources can be allocated to meet the transmission schedule.
13. The method of embodiment 12, wherein:
    the external network comprises a Time-Sensitive Network (TSN); and
    the data stream comprises a TSN stream.
14. The method of any of embodiments 12-13, wherein the information related to the transmission schedule includes one or more of the following:
    an identifier of the UE;
    identifiers of one or more quality-of-service (QoS) flows associated with the data stream; and
    a QoS requirement associated with each of the QoS flows.
15. The method of embodiment 14, wherein the response indicates whether the QoS requirement associated with each of the QoS flows can be met.
16. The method of any of embodiments 12-15, wherein each QoS requirement comprises one or more time windows during which the data stream is required to be transmitted.
17. The method of any of embodiments 12-16, wherein each QoS requirement comprises an initial time window and a periodicity that identifies subsequent time windows.
18. The method of any of embodiments 16-17, wherein:
    if it is determined that radio resources cannot be allocated to meet the transmission schedule associated with the data stream, the method further comprises determining one or more further time windows during which radio resources can be allocated; and
    the response further comprises an indication of the one or more further time windows.
19. The method of any of embodiments 16-18, wherein if it is determined that radio resources can be allocated to meet the transmission schedule associated with the data stream, the method further comprises mapping the one or more QoS flows to at least one radio bearer between the RAN and the UE and reserving transmission resources for the at least one radio bearer.

20. The method of any of embodiments 12-19, wherein determining whether radio resources can be allocated to meet the transmission schedule is further based on one or more of the following: resources needed for current or estimated traffic load, capabilities of the UE, channel quality between the RAN and the UE, and need for additional guaranteed resources to be allocated for the UE.

21. The method of any of embodiments 12-20, wherein the method is performed by gNodeB (gNB) in a 5G RAN (NG-RAN).

22. A method, performed in a user equipment (UE) in communication with a radio access network (RAN), for scheduling resources in the RAN according to a transmission schedule associated with an external network, the method comprising:
receiving, from the external network, a transmission schedule associated with a time-sensitive data stream;
sending, to a core network associated with the RAN, a request to allocate radio resources for communication of the data stream between the UE and the RAN, wherein the request further comprises information related to the transmission schedule; and
receiving, from the core network, a response indicating whether radio resources can be allocated to meet the transmission schedule associated with the data stream.

23. The method of embodiment 22, wherein:
the external network comprises a Time-Sensitive Network (TSN);
the data stream comprises a TSN stream; and
the transmission schedule comprises cycle times and gate control lists for one or more traffic classes comprising the TSN stream.

24. The method of any of embodiments 22-23, wherein the information related to the transmission schedule comprises the transmission schedule.

25. The method of any of embodiments 22-24, wherein if the response from the core network indicates that radio resources cannot be allocated to meet the transmission schedule of the data stream, the response further comprises an indication of one or more further time windows during which radio resources can be allocated.

26. The method of any of embodiments 22-25, further comprising based on the response from the core network, sending, to the external network, an indication of whether the transmission schedule can be met.

27. The method of embodiment 26, wherein if the response comprises the indication of one or more further time windows, the indication sent to the external network further includes information related to the one or more further time windows.

28. The method of any of embodiments 22-27, wherein:
the core network is a 5G core network (5GC); and
the request is sent to and the response is received from an access management function (AMF) of the 5GC.

29. A network node, in a core network associated with a radio access network (RAN), configured to schedule resources in the RAN according to a transmission schedule associated with an external network, the network node comprising:
a communication interface; and
processing circuitry operably coupled to the communication interface and configured to perform any operations of any of embodiments 1-11; and
power supply circuitry configured to supply power to the network node.

30. A network node, in a radio access network (RAN) associated with a core network, configured to schedule resources in the RAN according to a transmission schedule associated with an external network, the network node comprising:
a communication interface; and
processing circuitry operably coupled to the communication interface and configured to perform any operations of any of embodiments 12-21; and
power supply circuitry configured to supply power to the network node.

31. A user equipment (UE), in communication with a radio access network (RAN), configured to scheduling resources in the RAN according to a transmission schedule associated with an external network, the UE comprising:
a communication interface; and
processing circuitry operably coupled to the communication interface and configured to perform any operations of any of embodiments 22-28; and
power supply circuitry configured to supply power to the UE.

32. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 12-21.

33. The communication system of the previous embodiment further including the base station.

34. The communication system of the previous two embodiments, further including the UE, wherein the UE is configured to perform any of the operations comprising embodiments 22-28.

35. The communication system of the previous three embodiments, further including a core network in communication with the base station, wherein the core network is configured to perform any of the operations comprising embodiments 1-11.

36. The communication system of the previous four embodiments, wherein:
the processing circuitry of the host computer is configured to execute a host application, thereby providing the user data; and
the UE comprises processing circuitry configured to execute a client application associated with the host application.

37. A method implemented in a communication system including a host computer, a base station, and a User Equipment (UE), the method comprising:
at the host computer, providing user data; and
at the host computer, initiating a transmission carrying the user data to the UE via a cellular network comprising the base station;
at the base station, performing any of the operations comprising any of embodiments 12-21.

38. The method of the previous embodiment, further comprising, at the base station, transmitting the user data.
39. The method of the previous two embodiments, wherein the user data is provided at the host computer by executing a host application, the method further comprising, at the UE, executing a client application associated with the host application.
40. The method of the previous three embodiments, further comprising, at the UE, performing any of the operations comprising any of embodiments 22-28.
41. The method of any of the previous four embodiments, wherein the communication further includes a core network in communication with the base station, wherein the core network is configured to perform any of the operations comprising any of embodiments 1-11.
42. A communication system including a host computer comprising a communication interface configured to receive user data originating from a transmission from a User equipment (UE) to a base station, wherein the base station comprises a radio interface and processing circuitry, the base station's processing circuitry is configured to perform operations of any of embodiments 12-21.
43. The communication system of the previous embodiment further including the base station.
44. The communication system of the previous two embodiments, further including the UE, wherein the UE is configured to communicate with the base station and to perform any of the operations comprising any of embodiments 22-28.
45. The communication system of the previous three embodiments, further including a core network in communication with the base station, wherein the core network is configured to perform any of the operations comprising embodiments 1-11.
46. The communication system of the previous four embodiments, wherein:
the processing circuitry of the host computer is configured to execute a host application; and
the UE is configured to execute a client application associated with the host application, thereby providing the user data to be received by the host computer.
47. A non-transitory, computer-readable medium storing computer-executable instructions that, when executed by at least one processing circuit comprising a network node of core network, configures the network node to perform any of the operations comprising any of embodiments 1-11.
48. A non-transitory, computer-readable medium storing computer-executable instructions that, when executed by at least one processing circuit comprising a network node of a radio access network (RAN), configures the network to perform any of the operations comprising any of embodiments 12-21.
49. A non-transitory, computer-readable medium storing computer-executable instructions that, when executed by at least one processing circuit comprising a user equipment (UE), configures the UE to perform any of the operations comprising any of embodiments 22-28.

REFERENCES

IEEE 802.1AS
IEEE 802.1Qav
IEEE 802.1Qbu
IEEE 802.1Qbv
IEEE 802.1Qch
IEEE 802.1Qcr
IEEE 802.1CB
IEEE 802.1Qca
IEEE 802.1Qci
IEEE 802.1Qat
IEEE 802.1Qcc
IEEE 802.1Qcp
IEEE 802.1CS

The invention claimed is:

1. A method, performed in a core network associated with a radio access network (RAN), for scheduling RAN resources according to a transmission schedule associated with an external network, the method comprising:
receiving, from the external network, a transmission schedule associated with a time-sensitive data stream, wherein the time-sensitive data stream is a data stream of a Time-Sensitive Network (TSN);
sending, to the RAN, a request to allocate radio resources for communication of the data stream between the RAN and a user equipment (UE), wherein the request further comprises information related to the transmission schedule; and
receiving, from the RAN, a response indicating whether radio resources can be allocated to meet the transmission schedule associated with the data stream.

2. The method of claim 1, wherein:
the external network comprises the TSN;
the method is performed by an access management function (AMF) in a 5G core network (5GC); and
the transmission schedule comprises cycle times and gate control lists for one or more traffic classes comprising the data stream.

3. The method of claim 1, wherein the information related to the transmission schedule includes one or more of the following:
an identifier of the UE;
identifiers of one or more quality-of-service (QoS) flows associated with the data stream; and
for each of the identified QoS flows, one or more of the following QoS requirements:
one or more time windows during which the data stream is required to be transmitted; and
an initial time window and a periodicity that identifies subsequent time windows.

4. The method of claim 3, wherein:
the response includes one of more of the following:
a first indication of one or more further time windows during which radio resources can be allocated, when the response indicates that radio resources cannot be allocated to meet the transmission schedule associated with the data stream; and
a second indication whether the one or more QoS requirement for each of the QoS flows can be met; and
the method further comprises determining whether the transmission schedule can be met based on the included first indication and/or second indication.

5. The method of claim 1, further comprising sending, to the external network, an indication of whether the transmission schedule can be met.

6. The method of claim 1, wherein one of the following applies:
the transmission schedule is received from the external network and the radio resources are for downlink communication from the RAN to the UE; or
the transmission schedule is received from the UE and the radio resources are for uplink communication from the UE to the RAN.

7. A method, performed in a radio access network (RAN) associated with a core network, for scheduling resources in the RAN according to a transmission schedule associated with an external network, the method comprising:
- receiving, from the core network, a request to allocate radio resources between the RAN and a user equipment (UE) for communication of a time-sensitive data stream, wherein the time-sensitive data stream is a data stream of a Time-Sensitive Network (TSN) and the request further comprises information related to a transmission schedule associated with the data stream;
- based on the information related to the transmission schedule, determining whether radio resources can be allocated to meet the transmission schedule; and
- sending, to the core network, a response indicating whether the radio resources can be allocated to meet the transmission schedule.

8. The method of claim 7, wherein:
the external network comprises the TSN; and
the method is performed by gNodeB (gNB) in a 5G RAN (NG-RAN).

9. The method of claim 7, wherein the information related to the transmission schedule includes one or more of the following:
- an identifier of the UE;
- identifiers of one or more quality-of-service (QoS) flows associated with the data stream; and
- for each of the identified QoS flows, one or more of the following QoS requirements:
  - one or more time windows during which the data stream is required to be transmitted; and
  - an initial time window and a periodicity that identifies subsequent time windows.

10. The method of claim 9, wherein the response includes one of more of the following:
- a first indication of one or more further time windows during which radio resources can be allocated, when it is determined that radio resources cannot be allocated to meet the transmission schedule associated with the data stream; and
- a second indication whether the one or more QoS requirement for each of the QoS flows can be met.

11. The method of claim 9, wherein when it is determined that radio resources can be allocated to meet the transmission schedule associated with the data stream, the method further comprises mapping the one or more QoS flows to at least one radio bearer between the RAN and the UE and reserving transmission resources for the at least one radio bearer.

12. The method of claim 7, wherein determining whether radio resources can be allocated to meet the transmission schedule is further based on one or more of the following: resources needed for current or estimated traffic load, capabilities of the UE, channel quality between the RAN and the UE, and need for additional guaranteed resources to be allocated for the UE.

13. A method, performed in a user equipment (UE) in communication with a radio access network (RAN), for scheduling resources in the RAN according to a transmission schedule associated with an external network, the method comprising:
- receiving, from the external network, a transmission schedule associated with a time-sensitive data stream, wherein the time-sensitive data stream is a data stream of a Time-Sensitive Network (TSN);
- sending, to an access management function (AMF) of a fifth-generation (5G) core network associated with the RAN, a request to allocate radio resources for communication of the data stream between the UE and the RAN, wherein the request further comprises information related to the transmission schedule; and
- receiving, from the AMF of the 5G core network, a response indicating whether radio resources can be allocated to meet the transmission schedule associated with the data stream.

14. The method of claim 13, wherein:
the external network comprises the TSN; and
the transmission schedule comprises cycle times and gate control lists for one or more traffic classes comprising the data stream.

15. The method of claim 14, wherein the response includes one of more of the following:
- a first indication of one or more further time windows during which radio resources can be allocated, when the response indicates that radio resources cannot be allocated to meet the transmission schedule of the data stream; and
- a second indication whether the one or more QoS requirement for each of the QoS flows can be met.

16. The method of claim 15, further comprises sending to the external network an indication of whether the transmission schedule can be met, wherein:
the sent indication is based on the response from the AMF of the 5G core network; and
the sent indication also includes information related to the one or more further time windows when the response includes the first indication.

17. A network node, in a core network associated with a radio access network (RAN), configured to schedule RAN resources according to a transmission schedule associated with an external network, the network node comprising:
a communication interface; and
processing circuitry operably coupled to the communication interface and configured to perform operations corresponding to the method of claim 1.

18. A network node, in a radio access network (RAN) associated with a core network, configured to schedule RAN resources according to a transmission schedule associated with an external network, the network node comprising:
a communication interface; and
processing circuitry operably coupled to the communication interface and configured to perform operations corresponding to the method of claim 7.

19. A user equipment (UE) in communication with a radio access network (RAN) that is configured to schedule RAN resources according to a transmission schedule associated with an external network, the UE comprising:
a communication interface; and
processing circuitry operably coupled to the communication interface and configured to perform operations corresponding to the method of claim 13.

20. A non-transitory, computer-readable medium storing computer-executable instructions that, when executed by processing circuitry of a network node of a core network, configures the network node to perform operations corresponding to the method of claim 1.

21. A non-transitory, computer-readable medium storing computer-executable instructions that, when executed by processing circuitry of a network node of a radio access network (RAN), configures the network node to perform operations corresponding to the method of claim 7.

22. A non-transitory, computer-readable medium storing computer-executable instructions that, when executed by processing circuitry of a user equipment (UE), configures the UE to perform operations corresponding to the method of claim 13.

* * * * *

UNITED STATES PATENT AND TRADEMARK OFFICE
CERTIFICATE OF CORRECTION

PATENT NO. : 11,700,633 B2
APPLICATION NO. : 17/275044
DATED : July 11, 2023
INVENTOR(S) : Patel et al.

It is certified that error appears in the above-identified patent and that said Letters Patent is hereby corrected as shown below:

In the Specification

In Column 2, Line 53, delete "setup" and insert -- set up --, therefor.

In Column 19, Line 22, delete "use equipment 1730" and insert -- user equipment 1730 --, therefor.

In the Claims

In Column 28, Line 45, in Claim 4, delete "one of more" and insert -- one or more --, therefor.

In Column 29, Line 35, in Claim 10, delete "one of more" and insert -- one or more --, therefor.

In Column 30, Line 16, in Claim 15, delete "one of more" and insert -- one or more --, therefor.

Signed and Sealed this
Fifth Day of March, 2024

Katherine Kelly Vidal
*Director of the United States Patent and Trademark Office*